POWER TRANSMISSION MECHANISM FOR USE IN A PORTABLE DRILL RIG

Filed March 20, 1953 10 Sheets-Sheet 1

INVENTOR.
ALEXANDER B. OWEN
BY
Stevens, Davis, Miller and Mosher
ATTORNEYS

June 7, 1960 A. B. OWEN 2,939,681

POWER TRANSMISSION MECHANISM FOR USE IN A PORTABLE DRILL RIG

Filed March 20, 1953 10 Sheets-Sheet 2

INVENTOR.
ALEXANDER B. OWEN
BY
Stevens, Davis, Miller and Mosher
ATTORNEYS

INVENTOR.
ALEXANDER B. OWEN
BY
Stevens, Davis, Miller and Mosher
ATTORNEYS

June 7, 1960 A. B. OWEN 2,939,681

POWER TRANSMISSION MECHANISM FOR USE IN A PORTABLE DRILL RIG

Filed March 20, 1953 10 Sheets-Sheet 4

INVENTOR.
ALEXANDER B. OWEN

BY Stevens, Davis, Miller and Mosher
ATTORNEYS

POWER TRANSMISSION MECHANISM FOR USE IN A PORTABLE DRILL RIG

Filed March 20, 1953 10 Sheets-Sheet 5

INVENTOR.
ALEXANDER B. OWEN
BY
Stevens, Davis, Miller & Mosher
ATTORNEYS

INVENTOR.
ALEXANDER B. OWEN
BY
Stevens, Davis, Miller & Mosher
ATTORNEYS

June 7, 1960 A. B. OWEN 2,939,681

POWER TRANSMISSION MECHANISM FOR USE IN A PORTABLE DRILL RIG

Filed March 20, 1953 10 Sheets-Sheet 7

INVENTOR.
ALEXANDER B. OWEN
BY
Stevens, Davis, Miller and Mosher
ATTORNEYS

POWER TRANSMISSION MECHANISM FOR USE IN A PORTABLE DRILL RIG

Filed March 20, 1953 10 Sheets-Sheet 8

INVENTOR.
ALEXANDER B. OWEN
BY
Stevens, Davis, Miller & Mosher
ATTORNEYS

POWER TRANSMISSION MECHANISM FOR USE IN A PORTABLE DRILL RIG

Filed March 20, 1953 10 Sheets-Sheet 9

INVENTOR.
ALEXANDER B. OWEN
BY
Stevens, Davis, Miller & Mosher
ATTORNEYS

June 7, 1960 A. B. OWEN 2,939,681

POWER TRANSMISSION MECHANISM FOR USE IN A PORTABLE DRILL RIG

Filed March 20, 1953 10 Sheets-Sheet 10

INVENTOR.
ALEXANDER B. OWEN
BY
Stevens, Davis, Miller and Mosher
ATTORNEYS

United States Patent Office 2,939,681

Patented June 7, 1960

2,939,681

POWER TRANSMISSION MECHANISM FOR USE IN A PORTABLE DRILL RIG

Alexander B. Owen, Garland, Tex., assignor to Texas Instruments Incorporated, Dallas, Tex., a corporation of Delaware Filed Mar. 20, 1953, Ser. No. 343,627

27 Claims. (Cl. 255—19)

This invention relates to a power transmission mechanism as an integral part of a portable truck-mounted drill rig.

It is a necessary requirement for any portable drill rig to be a complete unit either mounting or carrying all the equipment essential to drill a given hole to the desired depth. Generally, the equipment of a portable drill rig can be classified into five assemblies according to function as in the following paragraph, although it must be understood that each assembly is dependent upon the others in achieving the desired result.

At the outset, a source of power is required in order to perform the various drilling operations. Due to the space and weight limitations of a truck, the power supply is generally furnished by the truck engine and delivered through a power take-off arrangement from the main drive shaft rather than from an auxiliary engine. The power take-off comprises the first assembly. The second assembly is the mast, an elongated structural framework which is necessary to the pull-down and hoist operations and to locate the drill stem in relation to the rotary drive. The next assembly is the drill stem and related components for actually drilling the hole. The drill stem assembly is controlled in a vertical direction through the mast and rotated by the rotary drive, a part of the power transmission assembly. As the drill bit at the lower end of the drill stem assembly rotates in the hole, cuttings are produced and must be removed if the hole is to be deepened. This leads to the use of a mud pump, the fourth major assembly of the portable drill rig. Water is pumped by the mud pump through the drill stem assembly, which is hollow for this purpose, and the cuttings are brought to the surface around the outside of the drill stem. And finally, the power transmission assembly provides the connecting link between the power take-off and all other operations of the drill. The necessary control levers and linkages are necessarily implied as a part of the power transmission assembly. The operations of the drill rig and the various assemblies will be explained and described more fully in subsequent paragraphs.

With the exception of the present invention, portable drill rigs in use today remain basically the same as the earliest models developed. It is true that improvements have been made, but the improvements have been directed toward individual parts or the rearrangement of a major assembly instead of a basic change in design. As a consequence, many of the disadvantages of the earliest portable drill rigs are incorporated into present day rigs.

The method of power transmission in these drill rigs offers an excellent illustration of some of the disadvantages referred to above. For example, a jaw clutch is keyed to a drive shaft and engages a winch drum to provide power for hoisting operations. Since the jaw clutch is formed with projections which mate with projections on the winch drum, the projections on the clutch and winch must be in alignment before the clutch can be engaged. With such an arrangement, the position of alignment must be carefully approached to avoid overshooting. Once the jaw clutch is engaged, any load on the winch line applies a pressure to the jaw clutch and makes disengagement of the clutch very difficult. To overcome this difficulty, two gears and a starter motor operated by a "back-up" button are provided to rotate the drive shaft in a reverse direction and allow the jaw clutch to be released. It can be seen that with a jaw clutch drive, numerous different operations are required to merely hoist and lower any portion of the drill stem assembly. Another disadvantage to the system is the manner in which power is delivered to the hoist and pull-down drive shaft. This shaft is usually at right angles to the truck's main drive shaft and driven either through a worm and worm wheel drive or a spiral bevel gear drive. While the spiral bevel gear drive is more efficient than the worm and worm wheel drive, neither approaches the efficiency that can be obtained by the use of spur gears or chains and sprockets. Thus, a large percentage of the available power is lost before drilling operations are begun.

Many drill rigs provide for only a single-speed drive to the rotary for rotating the drill stem. As a consequence, the drill stem rotates or attempts to rotate in hard formations at the same speed as in soft formations. In conjunction with the single-speed rotary, the power transmission drive permits only a single-speed for the pull-down drive; so, the same rate of penetration is provided for both hard and soft formations. Some drill rigs have included in the rotary drive a series of gears to provide different speeds for the rotary, but in so doing, additional complications have been introduced by the controls necessary to shift from one gear ratio to another.

In addition to the disadvantages mentioned above, there are still others. As a general statement, the position occupied by the components of the power transmission assembly is between the mud pump and the mast, and heretofore, no protective covering has been provided for the assembly. In this exposed condition all of the working parts are subjected to deterioration due to the weather, dust, mud, and dirt. Adequate lubrication cannot be provided under these circumstances. However, it must be recognized that in recent years, some drill rigs have provided a chain drive transmission to the rotary and enclosed the chains in a case for protection. This case, though, protected only the chains and left the remaining working parts such as the clutches, connecting linkages, and bearings exposed as in all other drill rigs.

By the present invention, a power transmission mechanism is supplied that overcomes the above enumerated disadvantages of the present art and beyond, provides additional advantages. Accordingly, it is an object of the present invention to completely enclose all parts necessary to the transmission and control of power for drill rig operations in a weather-proof and dust-tight case and provide lubrication for all moving parts.

It is another object of the present invention to eliminate unnecessary shafts and gear drives and accomplish the operations of hoist, brake, and free-wheeling by means of a unique gear arrangement and control all operations on each hoist shaft from a single control lever.

It is a further object of the present invention to provide a pull-down system that uses the same mechanism and unique gear arrangement for pull-down as for hoisting.

It is a still further object of this invention to provide an infinitely variable speed drive for the rotary drilling operations which is manually controllable but automatically self-adjusting to apply power in proportion to difficulty of drilling.

It is yet another object of this invention to provide an infinitely variable speed drive for pull-down operations which is manually controllable and automatically self-adjusting to apply load in proportion to the difficulty of drilling.

It is still another object of the present invention to simply the control system and reduce the number of different steps required to perform a given operation.

Other objects and advantages will become apparent from a consideration of the following description when taken in conjunction with the appended drawings in which.

Figures 1, 3:
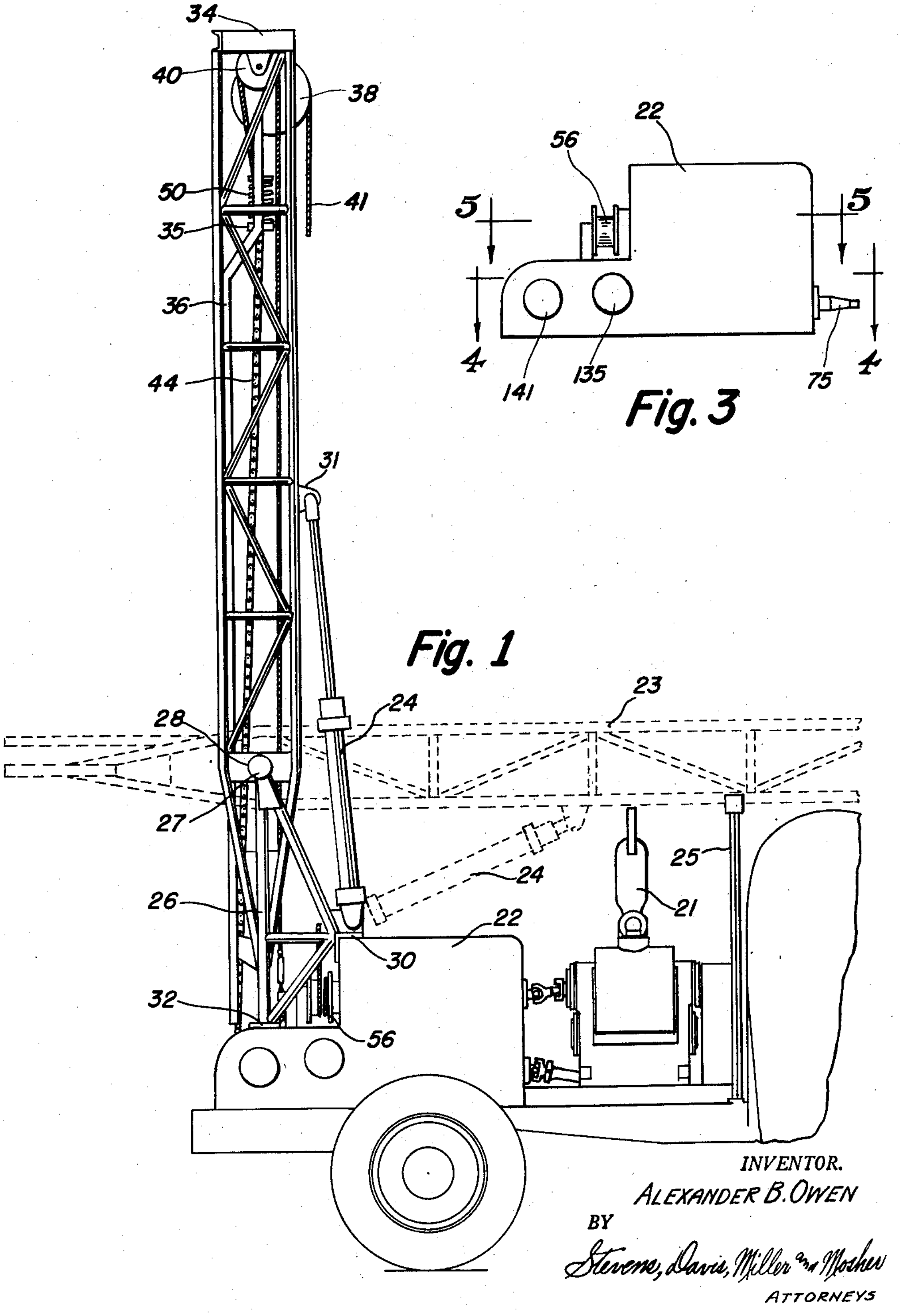
Figure 1 is a side elevation view of a typical truck-mounted, portable drill rig arrangement with the power transmission mechanism in place.
Figure 3 shows the general outline of the gear case enclosing the power transmission mechanism.
Figure 5:
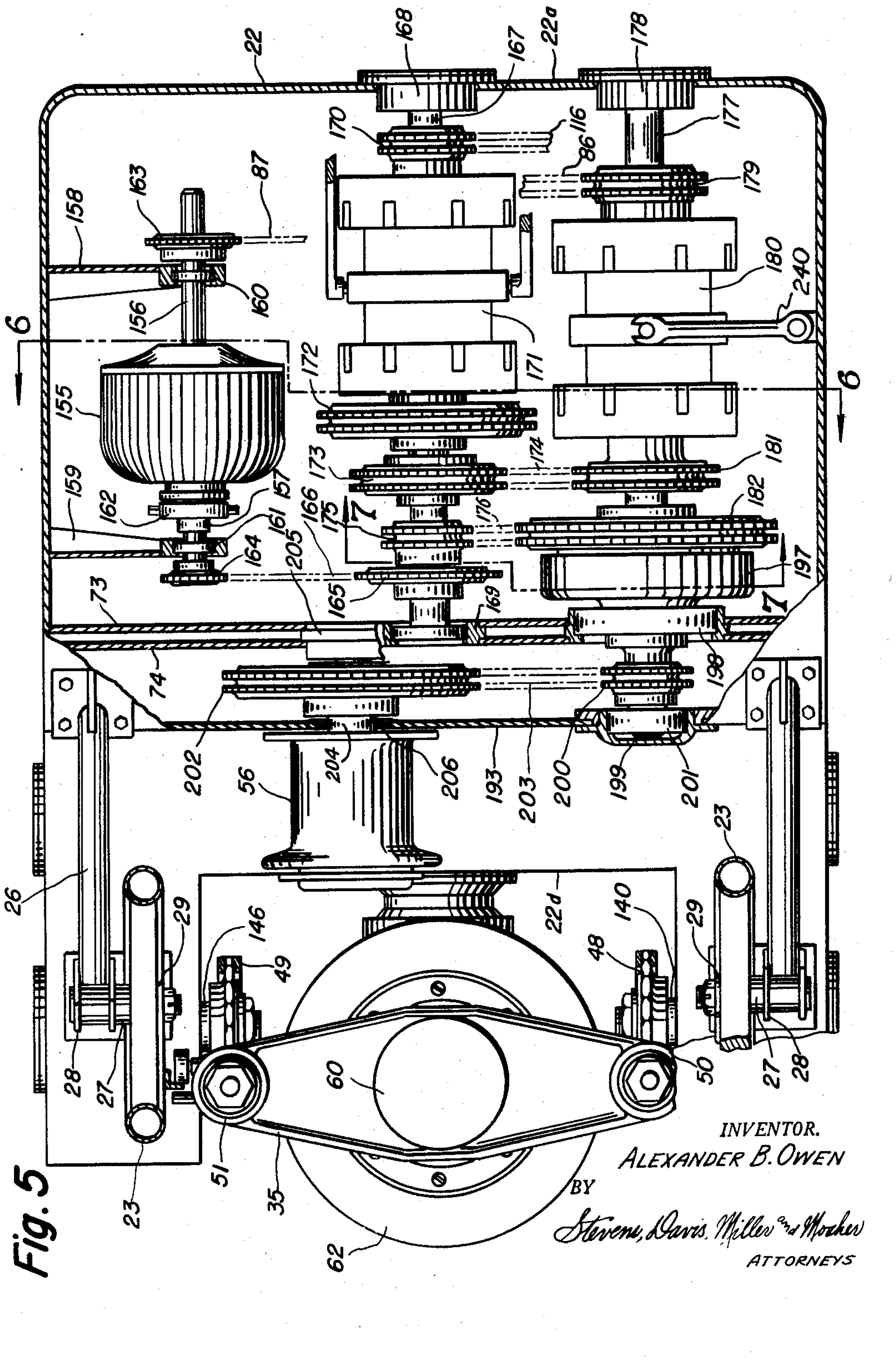

Figure 5 presents a sectional plan view taken along lines 5—5 of Figure 3 showing the upper level components of the power transmission mechanism.

Figure 4:
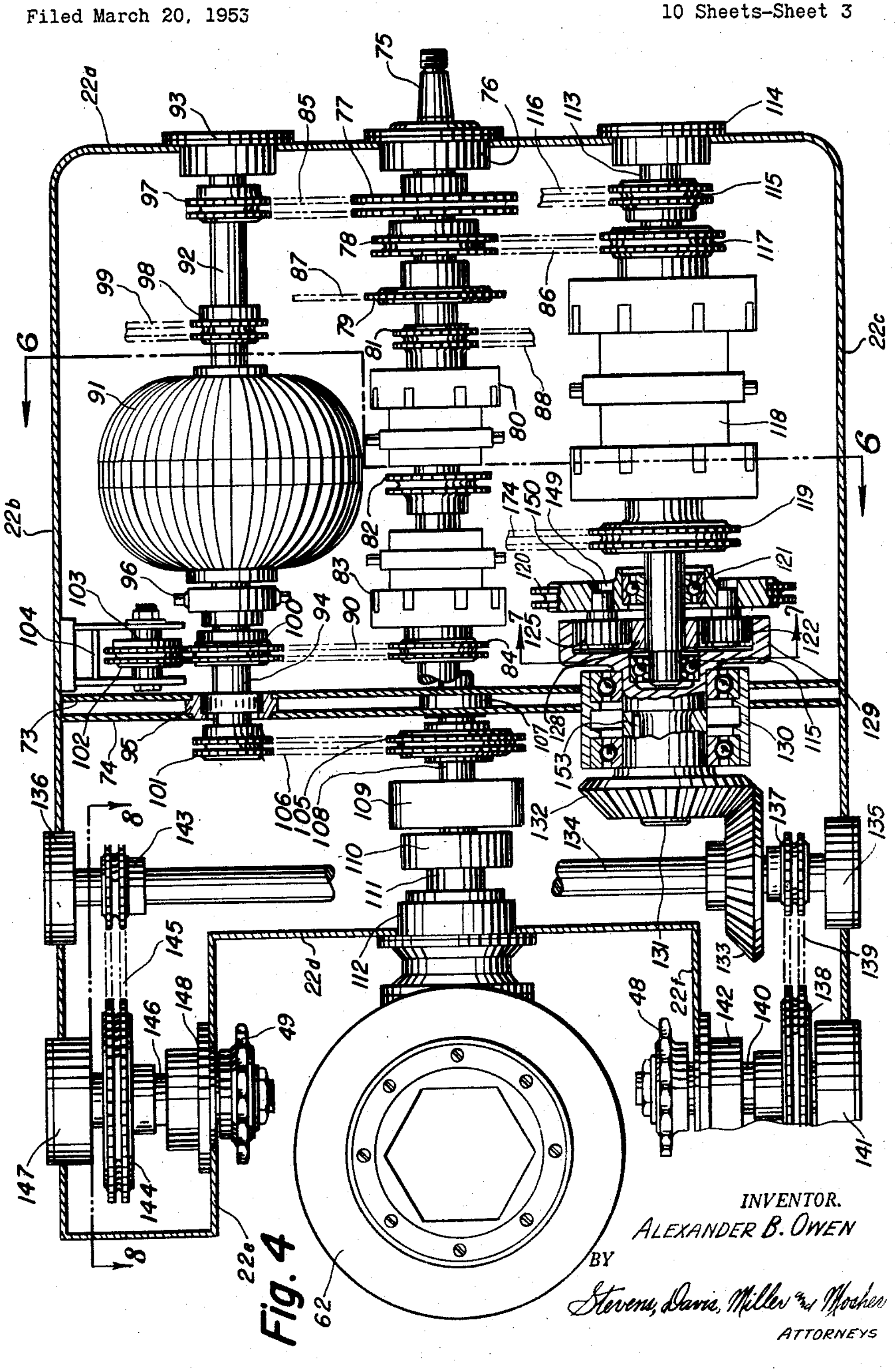
Figure 4 shows a sectional plan view taken along lines 4—4 of Figure 3 showing the lower level components of the power transmission mechanism and a cut-away view of the lower epicyclic gear train.
Figure 6:
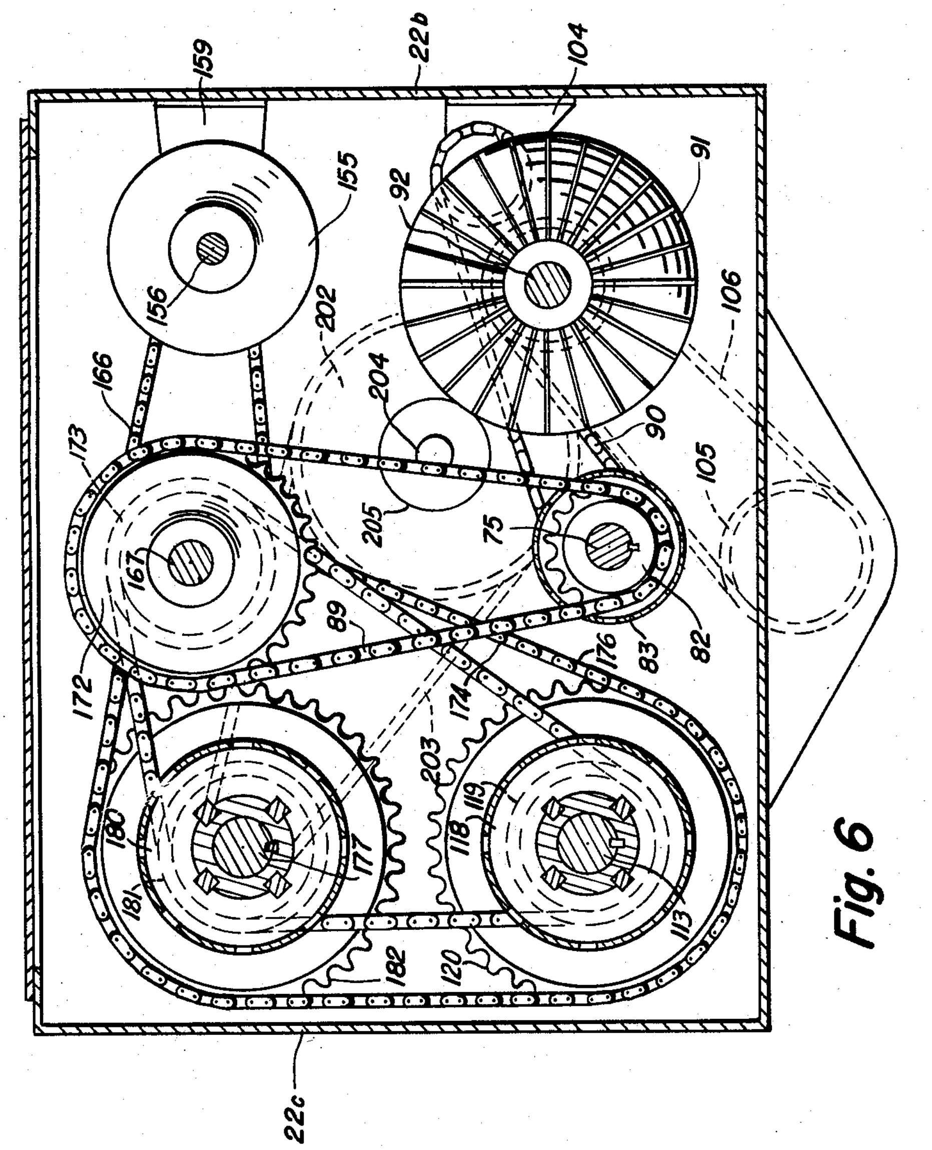

Figure 6 is a cross-sectional elevation taken along lines 6—6 of Figures 4 and 5 showing the upper and lower level power transmission components taken transversely across the enclosing case.

Figures 7, 8:
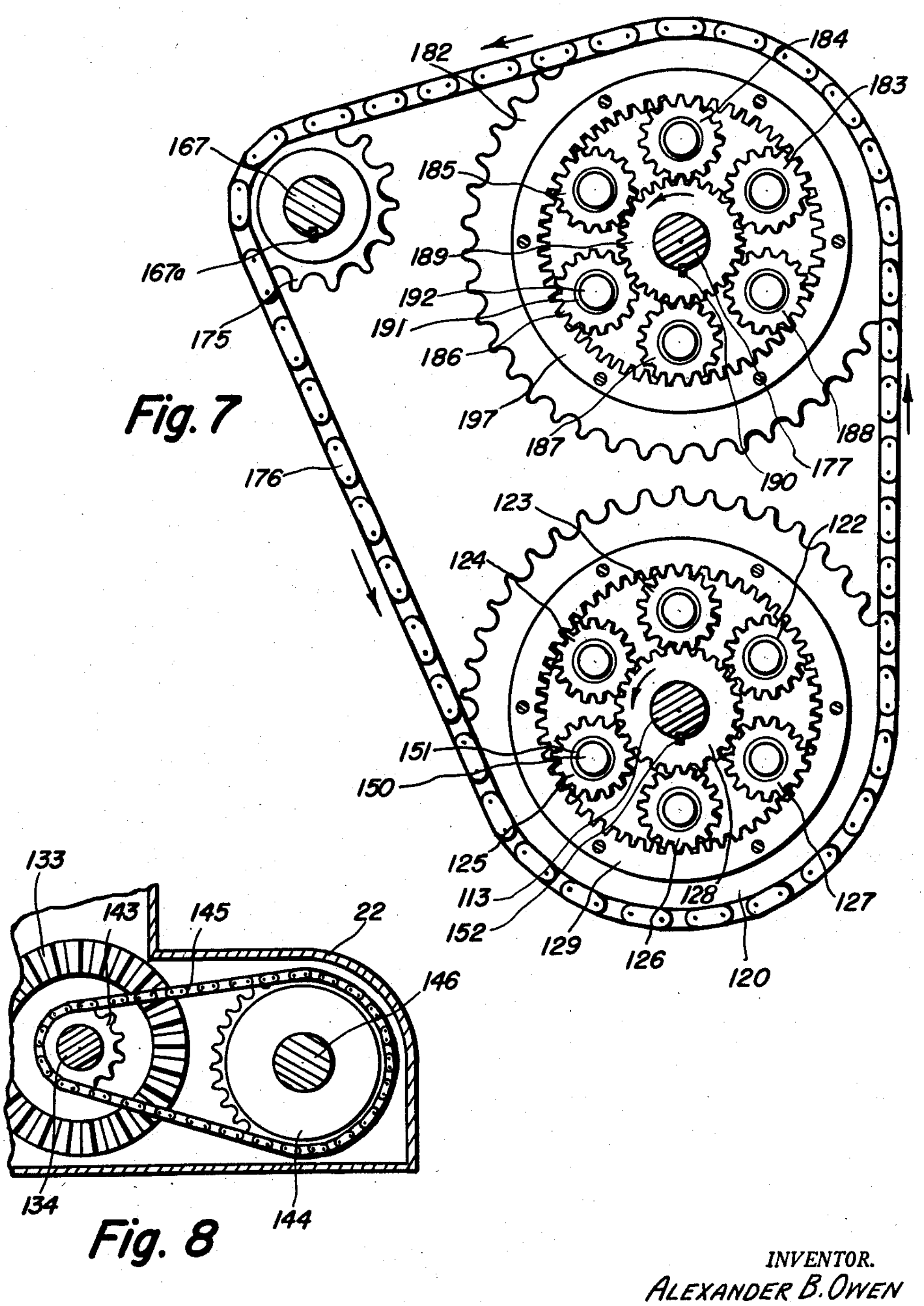

Figure 7 shows a sectional elevation view taken along lines 7—7 of Figures 4 and 5 showing the upper and lower epicyclic gear trains and the planetary gear carrier drive.

Figure 8 presents a side elevation section taken along lines 8—8 of Figure 4 showing the drive connections at the output of the transmission mechanism.

Figures 9, 10:
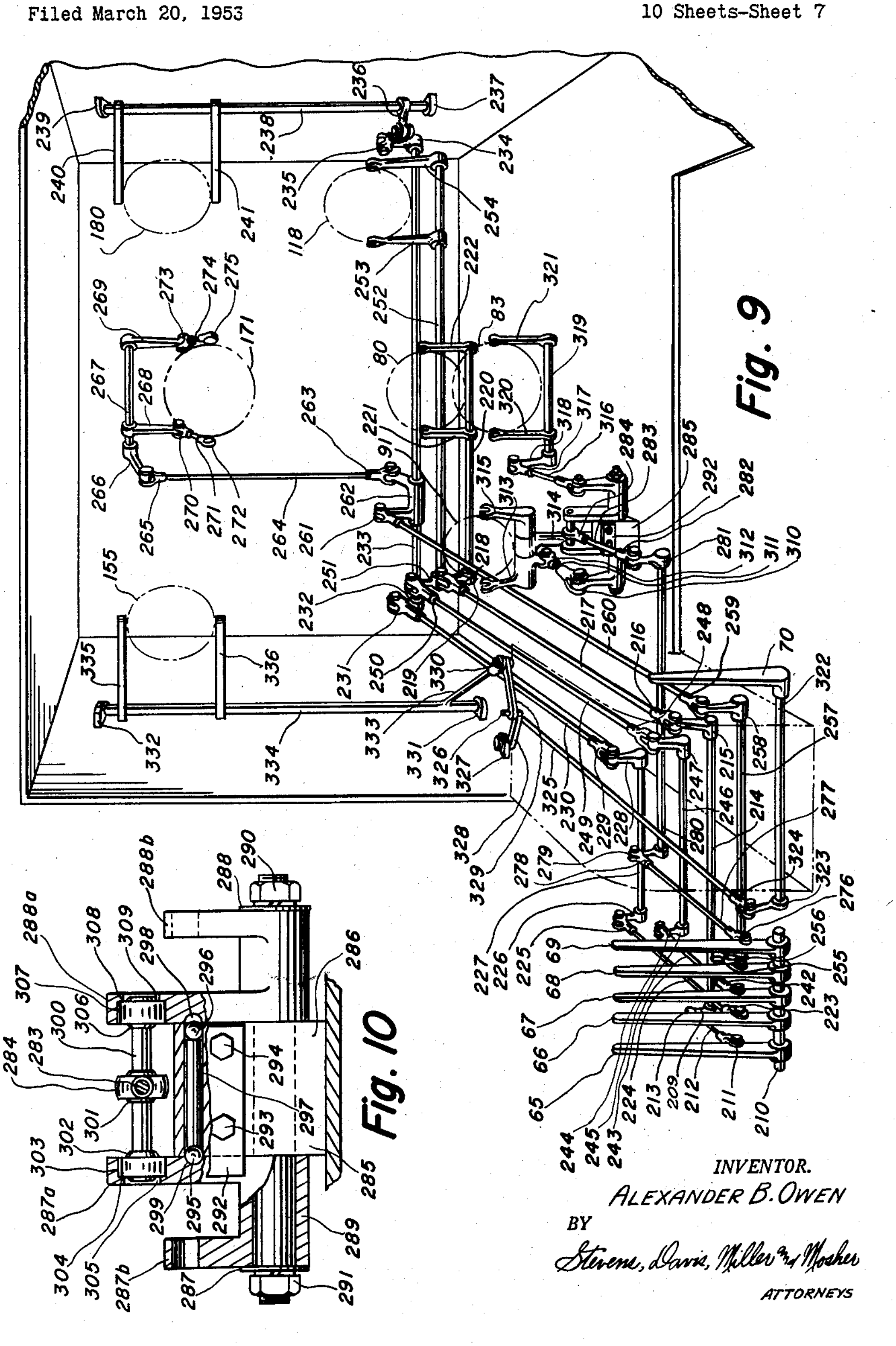

Figure 9 is a front perspective view of the control linkage and the linkage layout within the case.

Figure 10 is a partially cut-away detail of a linkage interlock control mechanism.

Figures 11, 14:
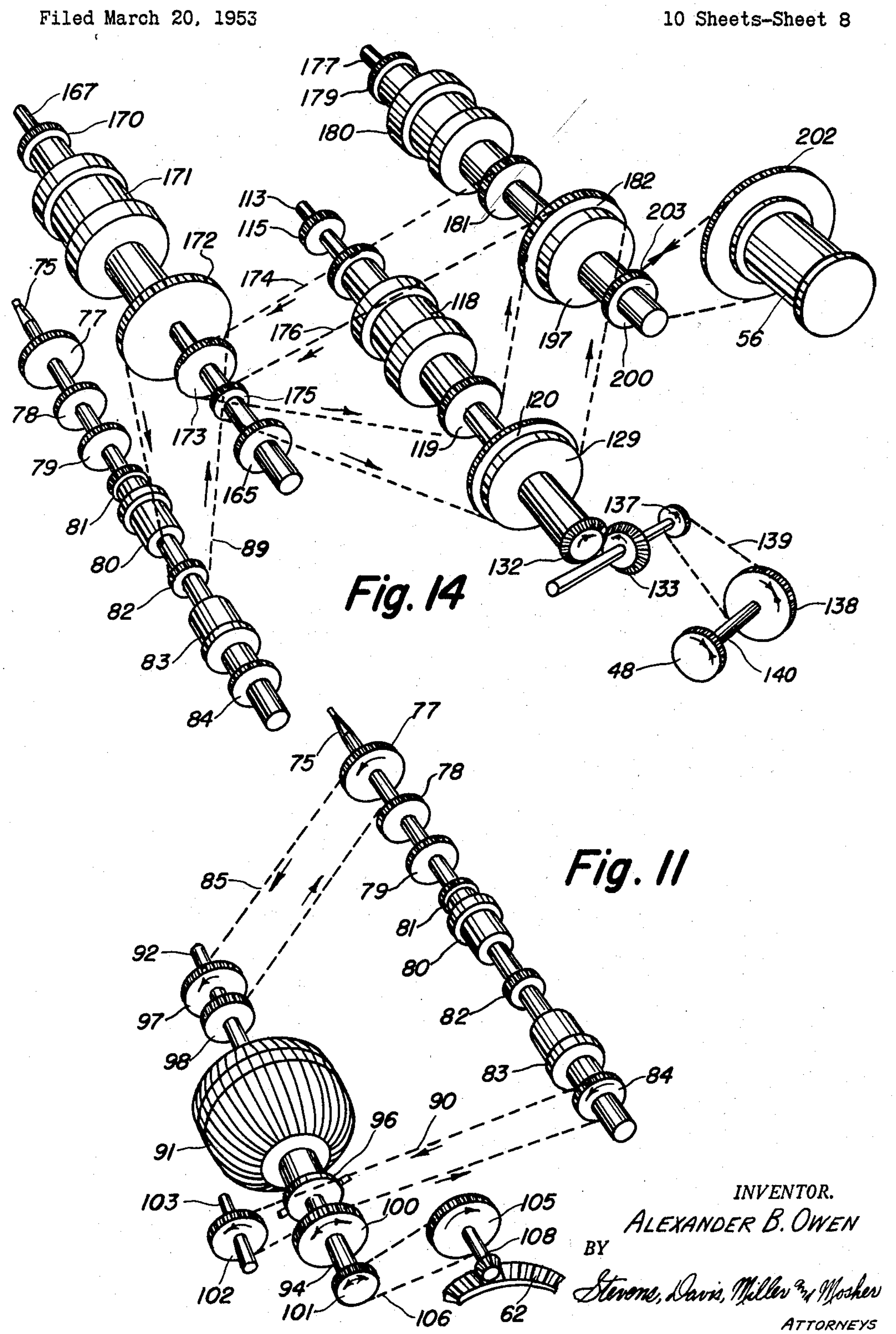

Figure 11 represents schematically the drive connections for the drill rig condition of rotary drive in both forward and reverse directions.

Figure 12:
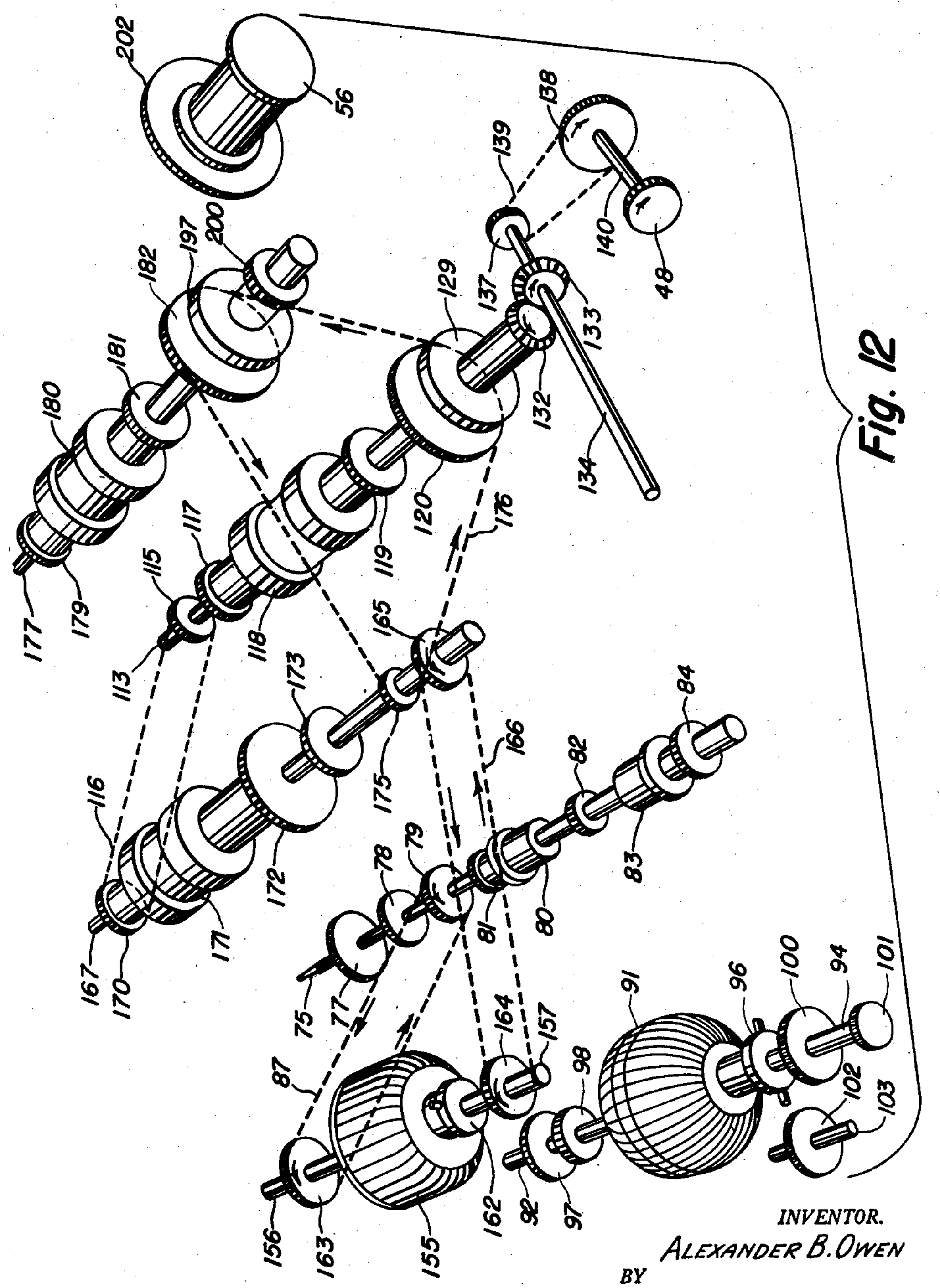

Figure 12 is a schematic presentation of the drives and connections to provide pull-down pressure for the drilling operation.

Figure 13:
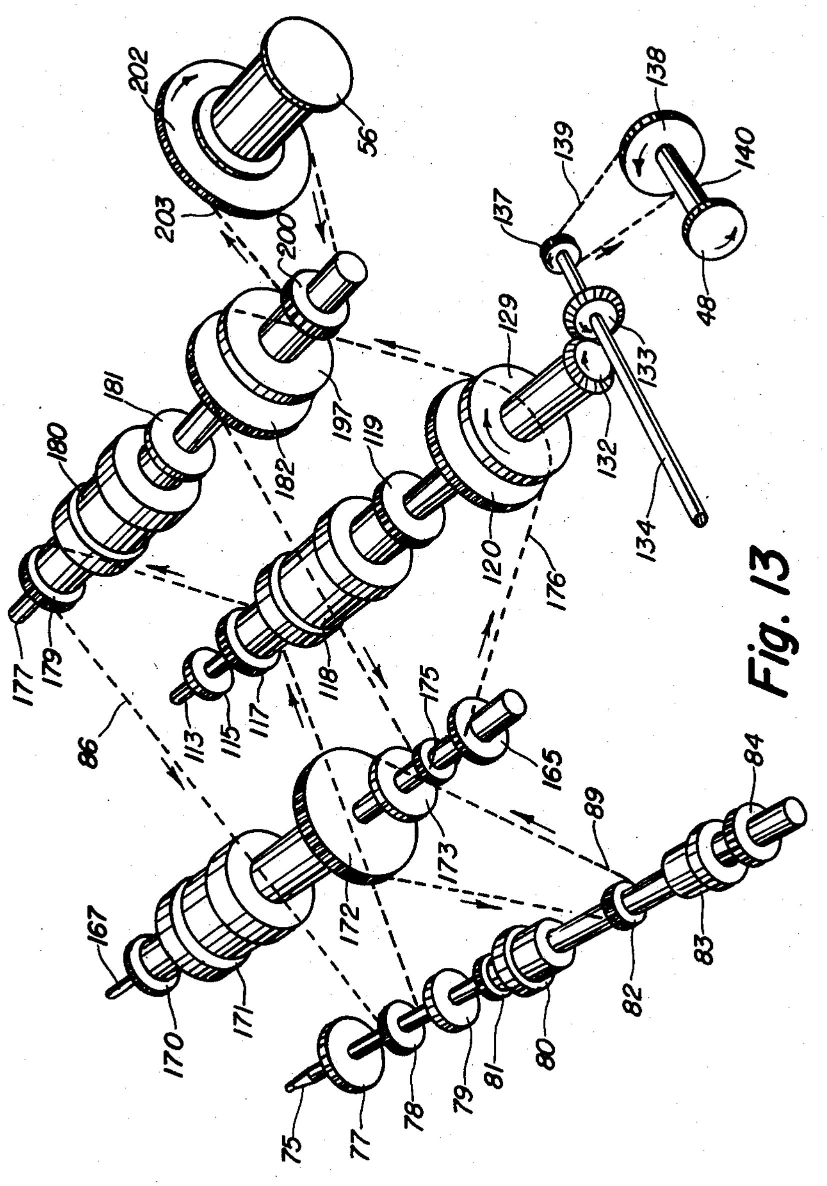

Figure 13 presents schematically the drives and connections for hoisting operations.

Figure 14 illustrates schematically the shafts and connections used to provide a brake for drill rig operations.

Figure 2:
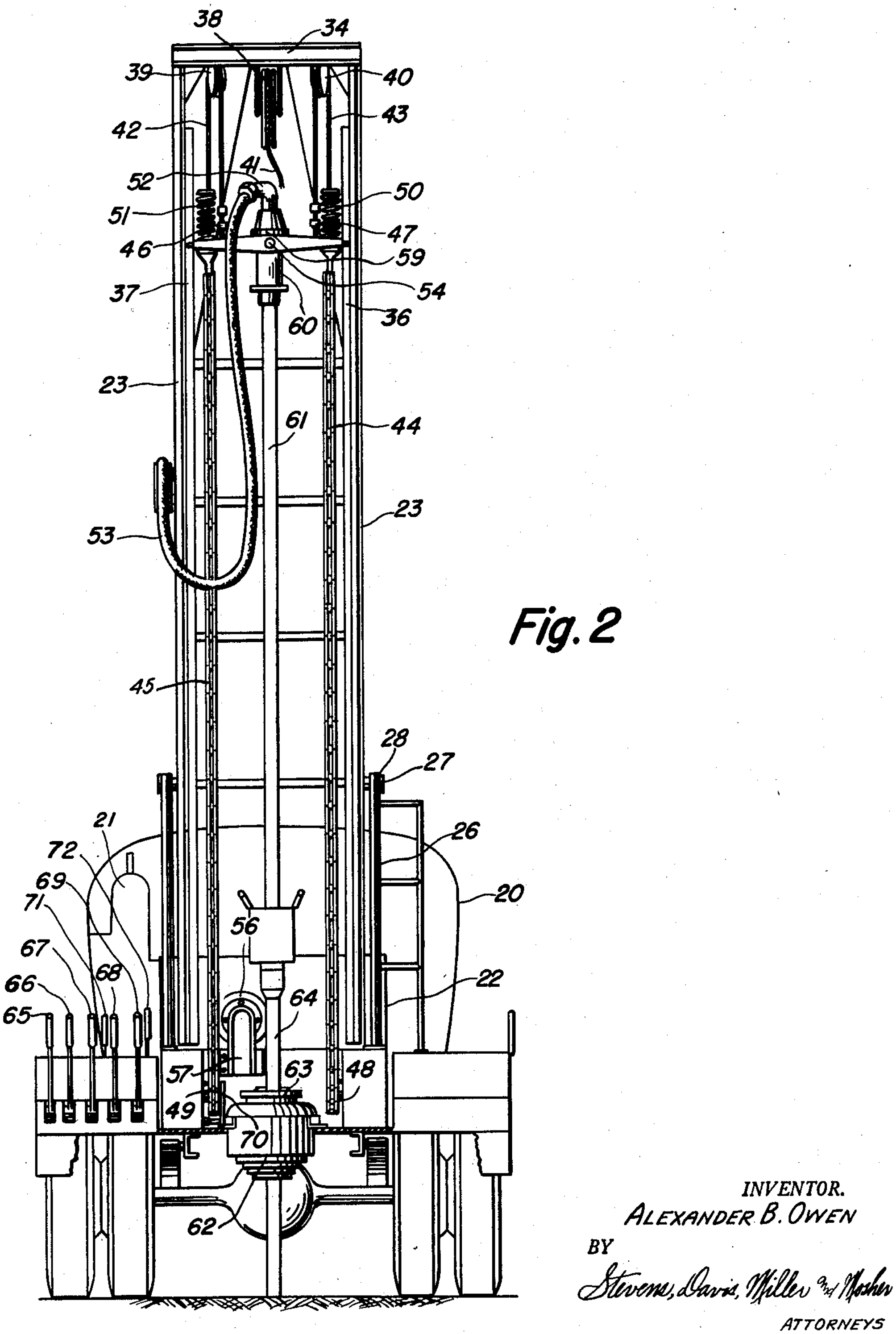
Figure 2 is a rear elevation view of a truck-mounted portable drill rig showing the various components used in drilling operations and the location of the power transmission control levers.

Referring now to the drawings, Figures 1 and 2 show the general layout for a portable, truck-mounted drill rig and incorporate the power transmission mechanism of the present invention. The truck for mounting the components of the portable drill rig is indicated generally by the number 20. In a direction taken from the truck cab toward the rear of the truck, the major assemblies are positioned on the truck bed with mud pump 21 first, gear case 22 second, and mast 23 in the most rearwardly position.

Mast 23 is an elongated structure framework, rectangular in cross-section and supported on each of two sides by a pivot support structure 26. Each pivot support structure 26 is in turn supported by gear case 22 at two points, one point by an angle and gusset plate arrangement 30 fixed to the rear upper edge of the gear case and the other by a bearing plate 32 on the lower level projecting portion of the case. The mast 23 is secured to each pivot support structure 26 by a pin 27 extending through a sleeve-type hinge 28 on support structure 26 and fastened to gusset plate 29 on the mast. Therefore, the sleeve-type hinge and pin connection allows mast 23 to pivot about pin 27.

The pivotal movement of mast 23 about pin 27 is controlled by means of a hydraulic cylinder and piston 24. The lower end of the cylinder is rotatably mounted on the gusset plate of pivot support structure 30 while the end of the piston rod is rotatably connected to a plate 31 welded approximately at the midpoint along the length of mast 23. When pressure is applied to the lower end of hydraulic cylinder 24 and the piston rod is in its extended position, the mast assumes a vertical position as shown in the solid lines in Figure 1. With pressure applied to the upper end of the cylinder, the piston rod is retracted and the mast moves to a horizontal position as shown by the dotted lines. In its horizontal position, the weight of mast 23 is supported by the pivot support structure 26 and by a saddle and pipe support 25 located immediately behind the truck cab.

At the upper end of mast 23 is a crown block 34 which mounts three pulleys, line hoist pulley 38 and Kelly hoist and pull-down pulleys 39 and 40. Each pulley is mounted so as to be free to rotate by structures not shown. Line 41 extends around line hoist pulley 38, the center pulley of the crown block, and one end is wound around line hoist drum 56 while the other end attaches a hook. Line hoist drum 56 is keyed to a shaft which is supported at the inside end by bearings within gear case 22 and at the outside end by bracket 57. Line hoist drum 56 is thereby controlled by the power transmission mechanism within case 22 and acts to hoist the drill stem into position for connection into the drill stem assembly. A further description of the operations of line drum hoist 56 and its control mechanism is given in subsequent paragraphs.

The outer two pulleys supported from the crown block 34 are used in conjunction with the hoist and pull-down operations of the drill. Lines 42 and 43 are placed around their respective pulleys 39 and 40, and are attached at one end to equalizer bar 35 by appropriate connectors 46 and 47. On the opposite side of the pulleys, the other end of each line extends vertically downward so that line 42 connects to chain 45 and line 43 connects to chain 44. Chain 44 fits around the teeth of sprocket 48 and in like manner, chain 45 fits around the teeth of sprocket 49. Both chains extend upward and are in effect connected to the underside of equalizer bar 35 by bolt, washer, and compression spring arrangements 50 and 51. Therefore, equalizer bar 35 is connected into a complete control loop formed by lines 42 and 43 on one side and chains 44 and 45 on the other and its vertical movement controlled by the direction of rotation of sprockets 48 and 49. Of course, pulleys 39 and 40 rotate according to the movement of the loop as controlled by the sprockets 48 and 49. Equalizer bar 35 is guided in a vertical direction by means of guide bars 36 and 37 which are welded to the sides of mast 23 and fit into slots in either end of the equalizer bar. As shown in Figure 1, guide bars 36 and 37 provide an offset guide for the equalizer bar at the upper end of mast 23. This allows clearance for operations in connection with the drill stem assembly.

Equalizer bar 35 is spread in the middle portion to received Kelly head 60. Kelly head 60 is supported in the equalizer bar by two equalizer bar pins, one of which is indicated by number 54. These pins allow the Kelly head to remain in a vertical position should the equalizer bar deviate from a horizontal position due to unequal lengths of chain between sprockets 48 or 49 and the ends of the equalizer bar. Kelly 61 threads onto the lower end of Kelly head 60 and drill stem 64 in turn threads onto the lower end of kelly 61. Before drill stem 64 is threaded onto kelly 61, it is first hoisted into mast 23 and lowered through rotary 62 so as to be in position to drill after the connection is made. As shown in Figure 2, slips 63 are used to support drill stem 64 in rotary 62 when not in operation.

The arrangement described in the preceding paragraphs allows the essential functions of pull-down and hoist to be accomplished. In the pull-down operation, sprockets 48 and 49 rotate in a direction to apply a downward pull on chains 44 and 45. Through the compression spring connections 50 and 51 at either end of chains 44 and 45, the pull of the sprocket drive is applied to the equalizer bar 35. This in effect applies the weight of the rear end of the truck and the equipment mounted thereon to the drill stem and provides the pressure required to force the bit through the various underground formations. The sprockets 48 and 49 rotate and maintain this pressure on the drill stem until the length of the drill stem has been used in deepening the hole. As the sprockets rotate, the movable arrangement composed of the chains, lines, pulleys and sprockets, moves the equalizer bar vertically downward the length of the drill stem. In the hoisting operation, the effective pull is applied to the line side of the loop by rotating sprockets 48 and 49 in the direction opposite to that required for pull-down. Thus, the downward pull on lines 42 and 43 is converted through pulleys 39 and 40 to an upward pull on equalizer bar 35.

Of course, it is recognized that the equalizer bar and the kelly and Kelly head assembly moves through one complete cycle of pull-down and hoist for each length of drill stem regardless of whether the purpose is to drill the hole or to hoist the drill stem out of the hole after it has been dug. The term pull-down is used in this sense to mean applying pressure to the drill bit during the drilling process as well as to lower the equalizer bar assembly when no pressure is required.

Water for drilling operations is supplied through a water swivel 52 which is connected to Kelly head 60 by means of swivel cap 59. One end of hose 53 connects into swivel 52 and the other connects to the discharge of mud pump 21. The swivel arrangement allows the stem assembly and the kelly to rotate in actual drilling operation without influencing the position of the water hose and connection. Thus, water is pumped through the hose and down the drill stem assembly to pick up the cuttings from the drill bit and carry them to the surface around the outside of the drill stem.

The above description of the portable drill rig incorporating the present invention is typically true for most portable drill rigs; however, it does not purport to be a complete description of all drilling operations and is intended merely to serve as an introduction to some of the operations required in drilling a hole.

It is apparent that many different types of power transmission mechanisms can be devised, but to date, none has been devised that is as advanced or offers the advantages of the arrangement shown in Figures 4 through 8 for transmitting power to the various drill rig operations. The power transmission mechanism of the present invention is enclosed in a weatherproof and dust-tight case with a side elevation outline as shown in Figure 3 and designated by letter subscripts to the numeral 22 when necessary to more clearly reference the location of various parts of the power transmission mechanism.

Generally speaking, the principal shafts and the components mounted thereon are located on two separate levels within gear case 22. As indicated in Figure 3, Figure 4 is a sectional plan view of gear case 22 along lines 4—4 of Figure 3 showing the lower level shafts and components and Figure 5 is a sectional plan view along lines 5—5 of Figure 3 showing the upper level shafts and components. Figures 4 and 5 are treated together in order to follow through the power transmission mechanism in a more logical order. Figure 6 is presented as an elevation view along lines 6—6 of Figures 4 and 5 to show the spacing and relation of the principal shafts to each other and the chains connecting the different shafts as are applicable to the section taken.

Referring first to Figure 4, the power output from the truck motor is applied through the power take-off from the main drive shaft to shaft 75, the central shaft in the lower level of the gear case. Shaft 75 is supported by bearing 76 from the side of the gear case designated 22*a* and is supported by another bearing not shown for purposes of clarity mounted in shaft support plates 73 and 74. Shaft support plates 73 and 74 extend across the width and height of gear case 22. Since shaft 75 is the power input shaft to the gear case, it necessarily follows that all other shafts, sprockets, and hydraulic couplings are driven from this shaft. For this purpose, double chain sprocket 77, double chain sprocket 78, single chain sprocket 79, double chain sprocket 81 and its control clutch 80, double chain sprocket 82, and double chain sprocket 84 and its control clutch 83 are mounted on shaft 75 and in that order from side 22*a* of the gear case toward plate 73. Sprockets 77, 78, 79, and 82 are all keyed to shaft 75 and rotate as the shaft rotates. The clutches 80 and 83 which control sprockets 81 and 84 are each formed with two elements, each mounting a series of friction plates. One of these clutch elements is keyed to shaft 75 and rotates as the shaft rotates. The other element is positioned around the fixed element so that its friction plates intermesh with the friction plates of the fixed element. This second clutch element and its respective sprocket 81 or 84 are integral units and free on shaft 75. Therefore, neither sprocket 81 nor sprocket 84 rotates until the friction plates of its clutch element are shifted into frictional engagement with the friction plates of the fixed clutch element by a control lever. When sprocket 81 is engaged, power is supplied through chain 88 to drive mud pump 21. The operation when sprocket 84 is engaged is described subsequently.

Drill rotary 62 is driven through variable speed hydraulic coupling 91 and thus is driven at the optimum speed for each formation due to the variable speed feature of its drive. The drive to the hydraulic coupling input shaft 92 is supplied by shaft 75 through sprocket 77 and chain 85. Chain 85 drives double sprocket 97 which is keyed to shaft 92. Two shafts are provided for the variable speed hydraulic coupling to allow for the variable speed output, which could not be obtained by the use of a single solid shaft. Shaft 92 serves as the input shaft and is connected to the coupling housing. Shaft 94 constitutes the output shaft of the hydraulic coupling and is connected to a sun gear within the coupling. Considering shafts 92 and 94 as a single shaft for purposes of support, one end is supported by bearing 93 from side 22*a* of the gear case and the other by bearing 95 mounted in shaft support plates 73 and 74.

The nature of the hydraulic coupling is such that within the housing are three planetary gears fixed to an arm which rotates with the housing. These three planetary gears are mounted to mesh with a large sun gear and rotate around it as the housing, and thus the planetary gear carrier arm, rotates. The sun gear is, in our case, attached to the output shaft 94. The hydraulic coupling housing is completely sealed and maintains an oil reservoir to a certain level within the housing. Therefore, as the housing rotates, oil is picked up and brought in through an inlet passage to what is in effect the input of three oil pumps. If this oil is free to discharge back into the reservoir, there is no tendency for the sun gear to rotate with the housing and the planetary gears continue to rotate around the sun gear. However, should the discharge passage be restricted, the oil becomes trapped between the intermeshing gear teeth and the back pressure of the oil restricts the rotation of the planetary gears and forces the sun gear to rotate with the housing. It is possible by controlling the restriction of the discharge area to vary the output of the hydraulic coupling from zero r.p.m. and zero torque to full input speed and torque. Variable speed hydraulic couplings of the type described are exemplified in U.S. Patents No. 2,526,914, issued October 24, 1950, and No. 2,531,014, issued November 21, 1950, both to John R. Thomas. The discharge area within the hydraulic coupling is controlled by means of a sliding collar 96 which is connected to the discharge area within the coupling. Collar 96 is moved through means of a control lever and linkage.

Again considering input shaft 92 to the rotary hydraulic coupling and the output shaft 94 as a single complete shaft, three additional double sprockets are mounted on the shaft in addition to those components already discussed. Sprocket 98 is mounted on the input shaft portion 92 and provides the drive for an oil circulating pump through chain 99. Although the oil circulating pump is not shown, one of its purposes is to circulate oil from the reservoir in gear case 22 and distribute it to all working parts within the gear case. It serves another purpose by providing hydraulic pressure to cylinder 24 to raise and lower the mast.

The remaining two sprockets, 100, and 101, serve as portions of the drive to rotary 62. When the rotary is to be driven in the forward direction, the rotary hydraulic coupling is engaged and the power output from the coupling is delivered to double sprocket 101 which is connected by chain 106 to double sprocket 105 keyed to the rotary pinion drive shaft 108. Drive shaft 108 is supported by bearing 107 in shaft support plates 73 and 74 at one end and by bearing 109 at the other end. Shaft 108 terminates in an internal spur gear which fits around an externally toothed spur gear which arrangement is represented by the number 110. The gear arrangement 110 is keyed to the rotary pinion shaft and drives the rotary through the rotary pinion and gear set. The rotary pinion is supported by tapered roller bearing 112 at side 22*d* of the gear case.

When rotary 62 is to be driven in the reverse direction, hydraulic coupling 91 delivers no power but instead the power is supplied from input shaft 75 through sprocket 84. Sprocket 84 drives reverse idler sprocket 102, and sprocket 100 through chain 90 to rotate shaft 94. As shaft 94 rotates, sprocket 101 delivers the power to sprocket 105 through chain 106 as before except for the direction of rotation. Reverse idler sprocket 102 is keyed to shaft 103 which in turn is supported by bracket 104. Bracket 104 is welded to side 22*b* of the gear case in line with sprockets 84 and 100. The chain drives and the operation of the levers to control the forward or reverse direction of the rotary is discussed more fully in connection with Figure 11.

Referring now to Figure 5 in conjunction with Figure 4, a second variable speed hydraulic coupling is incorporated into the gear case to provide power for the pull-down operation. Hydraulic coupling 155 is shown connected to input shaft 156 and to output shaft 157. Shaft 156 is supported at a level to clear the lower shaft and variable speed hydraulic coupling by bracket 158 fixed to side 22*b* of the gear case. Shaft 156 rotates in bearing 160 securely fixed to bracket 158. Similarly, shaft 157 is also supported from side 22*b* by bracket 159 and rotates in bearing 161 which is mounted in bracket 159. Since both supports 158 and 159 extend outwardly from side 22*b* of the gear case, it is clear that there is no interference with the hydraulic coupling sprockets and shaft for the rotary drive. The relation of the pull-down hydraulic coupling to the rotary hydraulic coupling is shown by the cross section elevation of the gear case in Figure 6.

Power from input shaft 75 is supplied to the pull-down hydraulic coupling by chain 87 connecting single sprocket 79 on input shaft 75 to single sprocket 163 on input shaft 156. As in the arrangement described for the rotary hydraulic coupling, collar 162 is connected to the discharge area from the sun gear and planetary gear enclosure to control the amount of oil discharged. When the discharge area is closed, power is delivered to output shaft 157 and thus to sprocket 164 which is keyed to shaft 157. Chain 166 connects sprocket 164 to sprocket 165 on drive shaft 167. Shaft 167 is appropriately termed the drive shaft since the Kelly hoist and brake shaft 113 in Figure 4 and the line hoist and brake shaft 177 in Figure 5 are driven from shaft 167 in performing the operations of hoist, pull-down, and brake.

In Figure 5, drive shaft 167 is supported at one end from side 22*a* by bearing 168 and from shaft support plates 73 and 74 at the other end by bearing 169. Beginning with side 22*a* and extending towards support plate 73 and 74, drive shaft 167 mounts a double control clutch 171 which controls sprockets 170 and 172 and sprockets 173, 175, and 165 in that order. Sprockets 173, 175, and 165 are all keyed to shaft 167 and rotate as it rotates. Each end of clutch 171 consists of two elements with a series of friction plates attached to each element. One of the clutch elements is keyed to shaft 167 while the other element is free on shaft 167 and integrally connected with either sprocket 170 or 172 as the case may be. Of course, neither sprocket 170 nor sprocket 172 is keyed to shaft 167. Thus, depending upon whether the clutch control lever is moved in a forward or reverse direction, either sprocket 170 or 172 will be engaged with shaft 167 through the frictional engagement of its clutch element with the keyed clutch element.

Drive shaft 167 is connected to line hoist and brake shaft 177 and Kelly hoist and brake shaft 113 through chains 174 and 176. Chain 174 connects sprockets 173, 181, and 119 mounted on the shafts respectively as named in the preceding sentence. Likewise, chain 176 connects sprockets 175 and plentary gear carriers 182 and 120 mounted respectively on shafts 167, 177, and 113. A comparison of shaft 113 in Figure 4 with shaft 177 in Figure 5 will reveal at once the similarity in their arrangement.

Describing shaft 113 first, one end is mounted in a bearing supported from side 22*a* of the gear case. At the other end, however, shaft 113 is supported by a bearing mounted in the hub of output gear 129 of the epicyclic gear train. Adjacent to bearing 114 is a sprocket 115 keyed to shaft 113. Next is sprocket 117, double clutch 118, and sprocket 119 in clutch arrangement exactly similar to that described for the double clutch 171 and the sprockets 170 and 172 mounted on drive shaft 167. The description for shaft 177 is exactly similar to that given for shaft 113 with the exception that there is no sprocket on shaft 177 between the bearing support 178 and the double clutch and sprocket arrangement consisting of sprockets 179 and 181 and double clutch 180.

The epicyclic gear train arrangement mounted on shafts 113 and 177 are again identical in arrangement and, therefore, are considered together. Figure 5 shows the upper epicyclic planetary gear carrier 182 with chain 176 in place and extending to gear 175 on the drive shaft. Output gear 197 is mounted adjacent to planetary gear carrier 182 and supported by bearing 198 from shaft support plates 73 and 74. Aside from the plan view given in Figure 5, the construction of the epicyclic gear train is clearly illustrated by the cutaway view in Figure 4 and the vertical section of both epicyclics in Figure 7.

In the cutaway view of the epicyclic, spider 120 is shown mounted on shaft 113 by a roller bearing 121 and consequently is free to rotate on the shaft. Spider 120 is drilled with six holes equally spaced from the centerline of shaft 113 and from each other as well. Typical of these drilled holes is the one designed by the number 149. Shaft 150 is turned down to a force fit diameter before it is placed into hole 149 in the gear carrier. The portion of shaft 150 outside of hole 149 carries planetary gear 125 mounted upon a needle bearing 151 so as to be freely rotatable. The planetary gearing for the lower epicyclic consists of planetary gears 122 through 127, all mounted in an identical manner to gear 125. The planetary gears rotate around sun gear 128, which is keyed to shaft 113 by key 152, and also mesh with output gear 129. Thus, within output gear 129 are the six planetary gears and the sun gear forming the epicyclic gear train. This arrangement is clearly illustrated for both upper and lower epicyclics in Figure 7, whereas the cutaway view in Figure 5 shows only a portion of the lower epicyclic gear train. The hub of output gear 129 is sufficiently elongated to extend within bearing 130 and provide a secure support for the epicyclic gear train. As previously indicated, a bearing 115 is located within the hub of output gear 129 to support the end of shaft 113.

The epicyclic gear train is perhaps the most important single feature of the present invention since it is through this arrangement that the operations of pull-down, hoist, and brake are accomplished. It is a well known characteristic of epicyclic gear trains that the direction of rotation of the output gear can be controlled to rotate in either direction by varying the speeds of the sun gear and the planetary gears. In addition, by providing the proper relative rotation between the planetary gears and the sun gear, the output gear can be made to stop without rotation in either direction. To illustrate the manner in which this is accomplished in the present invention, a sun gear is selected with 24 teeth, the planetary gears with 15 teeth, and the output gear with 54 teeth. For the condition of hoist, the sun gear is driven at a speed of 800 r.p.m. in a counterclockwise direction as viewed in Figure 7 and the planetary gear spider is driven at a speed of 111 r.p.m. also in a counterclockwise direction. The particular combination of speeds and gear tooth ratios selected combines to drive the output gear in a clockwise direction. When it is desired to stop the output gear, the input speed to the sun gear is reduced to 360 r.p.m.; or stated differently, the sun gear is driven at 3.25 times the speed of the planetary gear carrier. The operation of pull-down, which is accomplished by a counterclockwise rotation of the output gear, results when the relative speed between the sun gear and the planetary gears is less than 360 r.p.m. for the sun gear and 111 r.p.m. for the planetary gear spider. It is obvious that the same results could be accomplished by any other gear tooth ratio and speed ratio and the invention is not to be limited to the specific gear tooth ratios and speeds as specifically set forth above. The values given are intended merely to illustrate a convenient means to provide the desired output from the epicyclic gear trains.

It is apparent from the preceding discussion that the operations of hoist, brake, and pull-down are accomplished from the same shaft. To perform these same operations by any method other than one which uses a gear train equivalent to the epicyclic requires additional shafts and mechanisms. Also, the shift from one speed ratio to the other is accomplished by the forward or reverse movement of a single lever instead of the multiple levers required to operate multiple shafts, thereby resulting in simplification of the drilling operations.

The output of the epicyclic train gear in Figure 4 is applied to shaft 131 through output gear 129 keyed to shaft 131 by key 153. Miter gear 132 is supported within bearing 130 in like manner to output gear 129 and is keyed to shaft 131 by key 153 also. Therefore, the movement of output gear 129 is exactly duplicated by miter gear 132. Miter gear 132 mates with another miter gear 133 which is fixed to cross shaft 134. Cross shaft 134 is supported at the near end by bearing 135 mounted on side wall 22*c* of the gear case and by a bearing 136 at the opposite end mounted on side 22*b* of the gear case. Identical sprockets 137 and 143 are keyed to cross shaft 134 and transmit the output of the epicyclic gear train to sprockets 138 and 144 through chains 139 and 145. Sprocket 138 is fixed to shaft 140 and the shaft is supported by bearings 141 and 142 mounted on sidewalls 22*c* and 22*f* of the gear case, respectively. Shaft 140 extends outside of the enclosed gear case and mounts sprocket 48. Similarly, sprocket 144 is connected to shaft 146 which is supported by bearings 147 and 148 from side walls 22*b* and 22*e* of the gear case 22. Figure 8 shows a side elevation sectional view along lines 8—8 of Figure 4 showing the drive from cross shaft 134 to shaft 144. Sprocket 49 is attached to shaft 146 outside of gear case 22. As described in connection with the equalizer bar and drill stem assemblies, sprockets 48 and 49 transmit the power for the operations of pull-down, hoist, and brake as determined by the epicyclic gear train.

As to the upper epicyclic shown in Figure 5, the arrangement is very similar to the support for output gear 129. The hub of output gear 197 is supported by bearing 198 mounted on the shaft support walls 73 and 74 and thereby supports the epicyclic gear train. Shaft 199 extends within the hub of output gear 197 and is keyed thereto so as to duplicate the rotation of the output gear. The other end of shaft 199 is supported by roller bearing 201 from shaft support plate 193, a plate serving also as one side of gear case 22. Sprocket 200 is keyed to shaft 199 and connected by chain 203 to sprocket 202. Sprocket 202 is keyed to shaft 204 which is supported by bearing 205 from shaft support plates 73 and 74 and by bearing 206 from shaft support plate 193. Shaft 204 extends outside of gear case 22 and mounts line hoist drum 56. Thus, the line hoist drum is controlled by the upper epicyclic gear train to provide the operations of hoist and brake.

The control levers and the linkage for controlling the clutches and hydraulic couplings, which were mentioned in connection with the description of the components within gear case 22, are shown in Figure 9. In Figure 2, the control levers are shown in position on truck 20 as levers 65 through 70. The two additional levers, 71 and 72, do not constitute part of the power transmission mechanism but serve to complete the portable drill rig arrangement. Lever 71 controls the truck engine to supply power for the drilling operations. Lever 72 controls a valve from the discharge of oil circulating pump in gear case 22 to supply the pressure to hydraulic cylinder 24 and thus raise and lower mast 23.

A necessary portion of the control linkages for the present invention consists of bearings and bushings to allow for the necessary shaft rotation as well as to restrain the movement of the shafts in order to transmit the desired force to the clutches and hydraulic couplings. These bushings and bearings are not shown in Figure 9 in order to show the control linkages more clearly.

Beginning with the control linkages from left to right in Figure 9 as determined by the control levers, the first linkage to be described is that controlled by lever 65. Control lever 65 is mounted upon and rotates on a shaft 210 fixed at either end against lateral or axial movement. Rod 212 is connected to lever 65 by rod end clevis 211 at a point above shaft 210 whereby a forward push or pull on the handle of control lever 65 exerts a correspondingly greater push or pull on rod 212. Rod end clevis 213 at the opposite end of link 212 connects to a control arm 209 fixed to shaft 214. At the opposite end of shaft 214, control arm 215 connects to rod end clevis 216. Shaft 217 connects into rod end clevis 216 at one end and to rod end clevis 218 at the other end. Again, a right angle arm 219 is connected into a rod clevis 218 and fixed at its lower end to shaft 220. Shaft 220 is appropriately supported by bearings to prevent deflection or movement and mounts two open ended yoke arms 221 and 222. These yoke arms receive projections attached to the control element of single clutch 80 so that as control lever 65 is moved forward, yokes 221 and 222 move the control element to engage the friction plates of clutch 80. Thus, sprocket 81 is also engaged and, through chain 88, supplies power to operate mud pump 21.

The rod end clevises as used for this application are formed with double eyes at one end and separated by a space sufficient to allow another eye to be placed in between the two eyes of the clevis. The connection is then made by inserting a pin and cotter key through the eye connection. The opposite end of the clevis is an internally threaded opening for threading onto the end of a rod or shaft as the case may be. The control arms used are appropriately formed with a single eye at one end for insertion between the two eyes of the clevis while the opposite end is formed with an opening at right angles to the length of the control arm. When a control arm is fitted to the end of a rod or shaft and fastened thereto, the control arm extends outward at right angles to the axial length of the rod or shaft.

The next lever mounted from left to right on shaft 210 is control lever 66. Rod 224 is connected to control lever 66 by rod end clevis 223 at approximately the same point that rod 212 connects to control lever 65. Rod 224 transmits the motion of the control lever to shaft 227 through rod end clevis 225 and control arm 226. At the opposite end of shaft 227, control arm 228 connects to rod end clevis 229. Rod end clevis 229 is fixed to one end of shaft 230 and rod end clevis 231 is fixed to the opposite end. Shaft 233 is connected to shaft 230 through control arm 232 and rod end clevis 231 and the movement of shaft 233 is transmitted to shaft 238 through control arm 234, clevis 235, and control arm 236. Control arm 235 is connected to one end of shaft 233 and control arm 236 is connected to rod 238. Rod 238 is supported vertically on the side of gear case 22 by two projecting bearing plates 237 and 239. Two open ended yoke arms 240 and 241 are fixed to rod 238 and extend outwardly to engage projecting lugs on the control section for clutch 180. Control lever 66 controls three positions through this linkage. When control lever 66 is pushed forward, yoke arms 240 and 241 move the clutch control to engage the friction plates of the clutch element controlling sprocket 179, or in other words, the hoist section of clutch 180. When lever 66 is pulled backward, the yoke arms 240 and 241 move in the same direction as the lever to engage the brake section of clutch 180 and therefore, sprocket 181 is frictionally engaged to shaft 177. As control lever is moved to a neutral position, neither the hoist nor the brake section of clutch 180 is engaged.

The next linkage in order is controlled by lever 67. Rod 243 has rod end clevises 242 and 244 fixed at either end and is connected to lever 67 at a point above shaft 210 as before to give the required leverage. Shaft 246 has control arms 245 and 247 fixed at either end with control arm 245 connected to rod end clevis 244 and control arm 247 connected to rod end clevis 248. Shaft 246 turns and this movement is transmitted to shaft 249 through control arm 247 and rod end clevis 248. Shaft 249 moves axially to rotate shaft 252 through rod end clevis 250 and control arm 251. At the far end of shaft 252, two open ended yoke arms 253 and 254 are fixed to shaft 252 and extend upward to engage projecting lugs on the clutch control section of clutch 118. Clutch 118 is similar in all respects to clutch 180 in that as yoke arms 253 and 254 are moved forward, a section of clutch 118 frictionally engages sprocket 117 to shaft 113 for hoisting operations; and, as control lever 67 moves the yoke arms backward, the other clutch section frictionally engages sprocket 119 to shaft 113 for braking operations. Thus, control lever 67 has three positions with the forward position for hoist, rear position for brake, and central position for neutral.

The remaining double clutch mounted within gear case 22 is engaged or disengaged by control lever 68. Shaft 257 is connected directly to control lever 68 through a clevis 256 with double-eyed connection point at both ends and control arm 255. As in all other connections to the levers, the necessary leverage is provided by the point of connection above mounting shaft 210. Shaft 257 rotates and its rotational movement is converted to an axial movement in shaft 260 by control arm 258 and rod end clevis 259. Shaft 260 is connected to a double arm sleeve 262 through rod end clevis 261. Double arm sleeve 262 is constructed as a single piece with one arm separated slightly from the other and connected to the sleeve at right angles to the other arm. Therefore, if one arm extends vertically, the other arm extends in a horizontal direction. The vertical arm of sleeve 262 is connected to rod end clevis 261 and the horizontal arm is connected to rod end clevis 263. Rod end clevis 263 is fixed to the lower end of vertical rod 264 and rod clevis 265 is fixed to the upper end. Shaft 267 is connected to rod end clevis 265 through control arm 266 and supported from a side of gear case 22 by bearings not shown for the sake of clarity. Two additional control arms, 268 and 269, are fixed to shaft 267. Control arm 268 connects to a projecting lug on the control section of clutch 171 through rod 271 and a threaded eye connector 272 while the other control arm 269 is connected to the opposite control section lug through rod end clevis 273, rod 274, and threaded eye connector 275. It can be seen that as control lever 68 is moved forward, the motion converting linkage moves the clutch control section forward and similarly, as the control lever is moved backward, the control section moves backward. When control lever 68 is moved forward, sprocket 170 is frictionally engaged with shaft 167 and when moved backwards, sprocket 172 is frictionally engaged to deliver power to shaft 167.

Control lever 69, the remaining lever mounted on shaft 210, controls rotary hydraulic coupling 91 as well as single clutch 83. The control of these units is accomplished through the use of an interlock mechanism which allows the forward movement of control lever 69 to control the hydraulic coupling 91 and its backward movement to control clutch 83. The linkage connecting control lever 69 with the interlock mechanism is entirely similar to the linkages controlled by the other levers. Control lever 69 moves rod 277 axially so that a turning force is applied to shaft 280 through rod end clevis 278 and control arm 279. Rod end clevis 276 connects rod 277 to the control lever. The turning moment of shaft 280 is transmitted to a short rod 283 through control arm 281 and rod end clevis 282. The short rod 283 connects into a self-aligning rod end 284 on shaft 300 of the interlock mechanism. The interlock mechanism is indicated generally by the numeral 285.

The arrangement and details of interlock mechanism 285 is shown by Figure 10. Centerblock 286 for the interlock mechanism 285 is mounted on the bottom of gear case 22. The lower portion of center block 286 is drilled to receive shaft 289. When shaft 289 is in place in center block 286, two sleeve and arm arrangements 287 and 288 are mounted on the portion of shaft 289 extending from either side of center block 286. The ends of shaft 289 are threaded to receive nuts 290 and 291 and thus serve to hold the sleeve and arm arrangements securely in place against center block 286 but still allows them to turn on the shaft. The sleeve and arm arrangements approximate a U shape with the exception that one of the arms is shorter than the other. The longer arm for each is indicated by the letter subscript "*a*" and the shorter arm by the letter subscript "*b*"; thus, the longer arms are **287*a* and 288*a* respectively, and similarly, the shorter arms are 287*b* and 288*b***. The arms are formed on the end of the sleeve and extend at right angles to the axial length of the sleeve with both arms in the same plane.

Another hole is drilled through the upper portion of center block 286 to receive plunger 297. Also, approximately hemispherical areas slightly less than one radius deep are milled into the sides of arms **287*a* and 288*a* adjacent to center block 286. The radius referred to is the radius of the upper hole in center block 286. Two balls 295 and 296 of the same radius as the hemispherical holes in arms 287a and 288a are placed at either end of plunger 297 and the plunger and ball arrangement shifts back and forth to allow either ball 295 or ball 296 to be recessed in its respective hemispherical area 298 or 299. The length of plunger 297 is such that when, for example, ball 295 is recessed in hemispherical area 299, ball 296 clears the arm and sleeve arrangement 288 to allow it to turn on shaft 289. Stop 292 is fixed to center block 286 by bolts 293 and 294 to prevent arm and sleeve arrangement 287 from moving forward in a direction perpendicular to the plane of the paper but does not hinder the movement of arm and sleeve arrangement 288. A similar stop not shown is placed on the opposite side of block 286 for the purpose of stopping arm and sleeve arrangement 288 as the other arrangement 287** moves in the reverse direction.

The self-aligning rod end 284 is separated from shaft 300 by self-aligning bearing 301 positioned between the rod and the shaft. Two additional self-aligning bearings 302 and 306 are positioned at either end of shaft 300 and are carried in bushings 303 and 307 fixed to arms 287a and 288a respectively. Two holes are drilled in arm 287a, one with a diameter approximately equal to the diameter of bushing 303 and the other with a smaller diameter to form circular area 305. Thus, shoulder 304 is formed as a support for bushing 303. A similar shoulder 308 is formed in arm 288 by the two circular holes 307 and 309.

The operation of the interlock mechanism is as follows. As a pushing force is applied to the interlock mechanism by a forward movement of control lever 69, arm and sleeve arrangement 287 moves forward while the other arm and sleeve arrangement is prevented from moving by the stop not shown. Before the arm and sleeve arrangement 287 begins to move, arm 287a presses against ball 295 and shifts ball 295, plunger 297 and ball 296 to the right to position ball 296 in hemispherical area 298 in arm 288a. When control lever 69 is moved from the forward to the reverse position, arm and sleeve arrangement 287 is pulled backward until it meets stop 292 and further movement is prevented. The other arm and sleeve arrangement cannot move because of the positive check provided by ball 296. The backward pull is exerted through self-aligning rod end 284 and applied to both arms 287a and 288a through shaft 300. When arm 287a reaches stop 292, arm 287a is in a position to receive ball 295 and the pressure of arm 288a against ball 296 moves the balls and plunger to the left into hemispherical area 299. Therefore, arm and sleeve arrangement 288 is no longer prevented from moving. Arm arrangement 288 continues to move in a forward direction perpendicular to the plane of the paper as control lever 69 is pulled backwards. When lever 69 is again pushed forward, arm 288a again moves towards the center position and the force exerted by shaft 300 on arm 287a moves the ball and plunger assembly into arm 288a as the center position is reached. Thus, the interlock mechanism allows only one arm to move at a time and holds the other in a neutral position until the other arm reaches a neutral position. It is apparent that in order for one arm to move while the other remains in a fixed central position, shaft 300 must be free to move. The movement of shaft 300 is allowed by the three self-aligning bearings 301, 302, and 306.

As arm 287b moves forward, rod 311 moves forward also and is connected to arm 287b by rod end clevis 310. Rod 311 is fixed to yoke arms 313 and 315 through rod end clevis 312. Yoke arm 313 is constructed as a sleeve and arm arrangement with one arm extending vertically upward and the other arm extending vertically downward so that a movement of the vertically downward arm will transmit a directly proportional movement to the vertically upward arm. Yoke arms 313 and 315 are keyed to a shaft not shown and the shaft is supported by support 314 from the bottom of gear case 22. Yoke arms 313 and 315 are open ended to receive projecting lugs on the control collar 96, and as previously described, the control collar is connected to the oil discharge ports within hydraulic coupling 91. Since the only direction allowed by the interlock mechanism is a rearward movement of yoke arms 313 and 315, it follows that as the control collar is pulled backward, the discharge area within the hydraulic coupling is closed and the hydraulic coupling output shaft 94 begins to rotate and transmit power.

The rearward movement of control arm 288b moves rod 316 and thus transmits a turning moment to shaft 319 through rod end coupling 317 and control arm 318. Open ended yoke arms 320 and 321 are fixed to shaft 319 and receive projecting lugs on the control section of single clutch 83. Thus, a rearward movement of yoke arms 320, the only movement allowed by interlock mechanism 285, engages sprocket 84 to clutch 83 and power from input shaft 75 is transmitted to sprocket 84 by frictional engagement of the plates within the clutch.

Control lever 70 is mounted separately from control levers 65 through 69. Lever 70 is fixed to shaft 322 which is supported by bearings within the projecting portion of gear case 22. A control arm 323 is fixed at the opposite end of shaft 322 from lever 70 and connects to rod end clevis 324. The rotation of shaft 322 is converted by these connectors into an axial movement of rod 325. The opposite end of rod 325 is turned up as at pivot point 326 and receives one end of both links 328 and 329. The other end of link 328 is rotatably fixed in plate 327 welded to the side of gear case 22 while the other end of link 329 is connected to rod 333 by rod end clevis 330. The other end of rod 333 is welded to vertical shaft 334. Shaft 334 is supported vertically from the side of gear case 22 by bearing support plates 331 and 332. Two open ended yoke arms 335 and 336 are fixed to shaft 334 and engage projections on the control collar of hydraulic coupling 155. The movement of control lever 70 acts to increase or decrease the angle between links 328 and 329 depending upon whether the lever is moved forward or backward. As the angle between the two links changes, the end distance of rod 333 from the point fixed by plate 327 on the side of the gear case changes and thus, a rotational movement is applied to shaft 334. The rotation of shaft 334 is transmitted to the control collar through yoke arms 335 and 336. The oil discharge port within hydraulic coupling 155 is either progressively closed or opened by movement of control lever 70 and therefore power is applied to hydraulic coupling output shaft 157 in accordance with the position of the oil discharge port.

The control linkages within gear case 22 have been described in detail to illustrate a very convenient means for controlling the various drilling operations; however, anyone skilled in the art could devise other separate and different means to control these same operations. Therefore, the above description is not intended to serve as a limitation upon the present invention and any other control means is claimed as within the scope of this invention.

The description of the components of the invention and the relation of the invention to the general arrangement of a portable drill rig having been given, there is yet needed an explanation of how the elements within the gear case and the controls are related in order to perform the required drilling operations. This is accomplished by means of schematic diagrams showing the combination of components to perform each given operation.

The drive for rotary 62 in both forward and reverse directions is shown schematically in Figure 11. When rotary 62 is to be driven in the forward direction, control lever 69 is shifted forward and, through interlock mechanism 285, yoke arms 313 and 315 are engaged with the projecting lugs on the hydraulic coupling control collar 96. Thus, the control collar shifts and closes the oil discharge area from the sun and planetary gears in the hydraulic coupling to provide the desired degree of restriction. Sprocket 77 keyed to input shaft 75, delivers power to the hydraulic coupling input shaft 92 through chain 85. As the oil discharge valve is closed, the hydraulic coupling output shaft 94 is coupled with input shaft 92 and since sprocket 101 is keyed to shaft 94, it rotates in the same direction as input shaft 92. In this case, the direction is counterclockwise as established by input shaft 75. Sprocket 100, although keyed to shaft 94, has no influence upon the drive because its drive sprocket and control clutch, 84 and 83 respectively, is held in a disengaged position by the interlock mechanism 285. Therefore, as sprocket 101 rotates in a counterclockwise direction, sprocket 105 is also driven counterclockwise through chain 106. The direction of rotation of rotary 62 determined by a counterclockwise rotation of sprocket 105 is termed its forward direction drive.

When rotary 62 is to be driven in the reverse direction, power is supplied directly from input shaft 75 and not through hydraulic coupling 91 since the variable speed feature is required only when drilling. To drive the rotary in the reverse direction, control lever 69 is shifted to the reverse position and interlock mechanism 285 then maintains the hydraulic coupling in a neutral or no output position and allows clutch 83 to frictionally engage sprocket 84 to input shaft 75. Since sprocket 84 turns in a counterclockwise direction with input shaft 75, a reverse idler sprocket 102 is required to reverse the rotation and allow sprocket 100 to turn in a clockwise direction. This is accomplished by means of drive chain 90 which extends between sprockets 84 and 102 and engages the upper teeth of sprocket 100 to the tension side of the chain. The counterclockwise direction of rotation of sprockets 84 and 102 rotates sprockets 100 and 101 clockwise and consequently sprocket 105 through chain 106; therefore, the direction of the rotary is reversed.

Whenever a hole is being drilled, the operation of pull-down normally accompanies the operation of the rotary in order to apply pressure to the drill bit. The method of accomplishing pull-down in the present invention is shown schematically in Figure 12. Since pull-down is concerned with the rate of penetration, it is affected by the relative hardness of formations in the same manner as the rotary. Therefore, it too is driven through a variable speed hydraulic coupling. The input shaft 156 to hydraulic coupling 155 is driven from input shaft 75 by sprocket 79, chain 87, and sprocket 163. Sprocket 79 is keyed to shaft 75 and sprocket 163 is keyed to shaft 156. Control lever 70 varies the angular linkage at pivot point 326 and thereby moves the yoke arms 335 and 336 which engage the projections on the control collar 162. As the movement of the control collar closes the discharge area within the hydraulic coupling and restricts the flow of oil, output shaft 157 is coupled with input shaft 156 in relation to the degree of restriction of the discharge area. Sprocket 164 is keyed to shaft 157 and delivers the output from the hydraulic coupling through chain 166 to sprocket 165 fixed to drive shaft 167. Sprocket 175 is keyed to shaft 167 and drives both the upper and lower planetary gear carriers 182 and 120 by chain 176 extending around both planetary gear carriers and sprocket 175.

As discussed previously, it is necessary to provide the proper speed ratio between the planetary gears and the sun gear if output gear 129 is to be rotated in the proper direction to obtain pull-down on the drill stem; or in other words, rotate sprocket 48 in a clockwise direction to take up on the chain between sprocket 48 and the squalizer bar 35 shown in Figure 2. The speed of planetary gear carrier 120 is set by the revolutions per minute of shaft 167 and the ratio of the number of teeth on sprocket 175 to the number of teeth on spider 120. The upper epicyclic is not used for purposes of pull-down. To provide the proper relative speed for the sun gear of the epicyclic, control lever 68 is moved forward and the control linkage operated by lever 69 shifts the control section of double clutch 171 to frictionally engage sprocket 170 with shaft 167. When clutch 171 is thus engaged, sprocket 170 rotates a sprocket 115 keyed to shaft 113 by means of chain 116 and the epicyclic sun gear thereby rotates since it is keyed to shaft 113. In the pull-down operation, double clutch 118 on shaft 113 remains in a neutral position. The proper speed ratio for the sun gear is established by the ratio of the number of teeth in sprocket 170 to the number of teeth in sprocket 115 in conjunction with the speed of shaft 167. Output gear 129 then rotates to drive sprocket 48 in a direction to take up on the chain 45 through miter gears 132 and 133, sprockets 137 and 138, and chain 139. Although it is not shown, sprocket 49 is also rotated simultaneously to take up on its chain 44.

For the condition of hoist, there is no necessity for a variable speed drive; therefore, power for hoisting operations, either kelly or line hoist, is provided directly from the input shaft. The shafts, sprockets, and chains required to perform the hoisting operations are shown schematically in Figure 13. As stated, the power to hoist is provided from input shaft 75 and is delivered by sprocket 78 keyed to the input shaft. Sprocket 78 is connected by chain 86 to sprocket 179 mounted on the line hoist shaft 177 and sprocket 117 mounted on the kelly hoist and brake shaft 113. Before either sprocket 179 or 117 can deliver power to their respective shafts 177 and 113, their respective control levers must be shifted to engage the appropriate clutch.

There are two distinct hoisting operations required in drilling operations, one for the kelly hoist and the other for the line hoist. Considering the kelly hoist first, lever 67 is moved forward and the control linkage shifts the control section of clutch 118 to engage sprocket 117 to shaft 113. Shaft 113 then turns the lower epicyclic sun gear at a speed equal to the speed of input shaft 75 times the ratio of the number of teeth of sprocket 78 to sprocket 117. Since the planetary gear carrier must be driven at some pre-determined speed relative to the speed of the sun gear to allow the epicyclic output gear 129 to rotate in a direction to hoist, planetary gear carrier 120 is also conected to the input shaft 75. This drive is provided by shifting the control lever 68 for clutch 171 to the rear to engage sprocket 172 with drive shaft 167 and thus rotate shaft 167 through chain 89 connecting sprocket 172 to sprocket 82 on input shaft 75. Drive shaft 167 then rotates sprocket 175 which is connected to planetary gear carrier 120 through chain 176. With the proper relative speed between the lower epicyclic sun gear and planetary gear carrier 120, output gear 129 is rotated in a clockwise direction to take up on the chain and equalizer assembly and therefore, hoist the kelly. Of course, the direction of rotations for the hoist condition are reversed from the rotations in the pull-down condition for all components from the output gear 129 to sprocket 48.

The second hoist required in any drilling operation is the line hoist. In the present invention, chain 86 connecting sprocket 117 to sprocket 78 on input shaft 75 also extends around sprockets 179 mounted on line hoist and brake shaft 177. The upper planetary gear carrier 182 is connected by chain 176 with sprocket 175 on drive shaft 167, the same chain and drive sprocket for the lower planetary gear carrier 120. Therefore, in shifting into a line hoist condition, it is necessary only to shift control lever 66 forward to engage sprocket 179 with shaft 177 through clutch 180. The same speed ratios between the sun gear and planetary gear carrier for the lower epicyclic are effective in the upper epicyclic to allow output gear 197 to rotate in a clockwise direction and provide a clockwise direction of rotation to line winch drum 56 through sprockets 200 and 202 and chain 203. It should be noted that both line hoist and kelly hoist operations can be carried on simultaneously if desired due to the arrangement of chains 86 and 176.

The brake condition shown schematically in Figure 14 is very similar to the hoist condition described in connection with Figure 13. As can be seen from Figure 14, both epicyclic planetary gear carriers 120 and 182 are connected by chain 176 with sprocket 175 on drive shaft 167. Also, sprocket 181 on shaft 177 and sprocket 119 on shaft 113 are both connected by chain 174 with sprocket 173 on shaft 167. Therefore, as for the hoisting operations, braking conditions are provided for both line and kelly operations from the same set of chains. To change from a line hoist condition to the line brake condition, it is necessary only to shift lever 66 to the rear to disengage sprocket 179 from the epicyclic and engage sprocket 181. Similarly, to change from the kelly hoist condition to the kelly brake, it is necessary only to shift lever 67 to the rear to disengage sprocket 117 from the lower epicyclic and engage sprocket 119.

Due to the gear train of the epicyclic and the fact that the epicyclic is chain connected through two different chains to another shaft, no load is transmitted during braking to the input shaft and consequently, no strain is put on the truck engine. The truth of this statement can be demonstrated by an analysis of the forces involved. For example, consider the situation where a weight acts against either the line winch drum or the pull-down and hoist sprockets. The force created by this weight is transmitted back through the various sprockets and chains to the appropriate epicyclic out-put gear in a manner tending to rotate the gear in a counterclockwise direction as viewed in Figure 14. Any counterclockwise direction of rotation of either output gear transmitted to its planetary gears would also cause them to rotate in a counterclockwise direction and rotate the planetary gear carrier. The direction of rotation of the sun gear, however, would be directly opposite to that of the planetary gear carrier. The tension created in chain 176 by the force tending to cause rotation of the planetary gear carrier would be transmitted to sprocket 175 keyed to drive shaft 167. Likewise, the force applied to the sun gear would be transmitted through chain 174 to sprocket 173 also keyed to drive shaft 167, but the direction of the tension would be opposite to that created by chain 176. Therefore, if the torque arms of the sprockets involved are equal to each other, the tension in chain 176 will be equal to the tension in chain 174 but the tensions will be in opposite directions and counter-balance each other through shaft 167. It follows from this that no load is transmitted through chain 89 to the input shaft 75 and the only load transmitted by the input shaft 75 will be the frictional losses in transmission. The braking condition for this invention is determined by a gear ratio which provides a relative speed for the sun gear of 3.25 times the speed of the planetary gear carrier. It goes without saying that the brake section of either clutch 118 or 180 or both must be engaged if the described braking action is to occur.

After the drill rig has drilled down the length of a section of drill stem, another section must be placed in the drill stem assembly in order to continue drilling the hole. To add another section of drill stem, the kelly must be broken loose from the drill stem in the hole and hoisted out of position and another section of drill stem hoisted into the mast and lowered to the rotary table, screwed to the drill stem, then lowered back into the hole. After the kelly and drill stem have been hoisted by their respective epicyclic gear trains, the drill stem is lowered through the force of gravity into position and then the kelly is lowered by gravity into position on top of the drill stem.

As indicated, the present invention provides the feature of braking when either clutch 118 or 180 or both are shifted into the brake position by the appropriate control lever. To allow the drill stem to be lowered into position, control lever 66 is moved to its neutral position. Clutch 180 then disengages sprocket 181 from shaft 177 and the tension is released in chain 174 which allows the weight of the drill stem to rotate output gear 197 and thus the members of the drive connected by chain 176. Similarly, by shifting control lever 67 for clutch 118 to its neutral position, sprocket 119 is disengaged from shaft 113 to release the tension in chain 174. The kelly then descends due to the force of gravity since output gear 129 is free to rotate and to rotate its connected planetary gear, chain 176, and shaft 167.

The power transmission and control mechanism of the present invention has been developed for use in a portable drill rig for seismic exploration purposes. However, it is apparent that the power transmission mechanism of the present invention is not limited to this use but can be used for any other purpose where a drilled hole is required, such as in taking core samples, and drilling anchor holes and water wells. Neither should the fact that it is susceptible of being incorporated into a portable drill rig be construed as a limitation upon this invention. The purpose of the power transmission is to provide the drives necessary for drilling operations; therefore, a hole of any size and depth could be drilled by the mechanism of this invention by a comparable change in capacity without sacrificing any of its novel features. By actual field tests, the power transmission mechanism has proved to be very efficient in operation. Without accurate measurement, its power output compared with power input indicates an efficiency of power transmission in excess of 90%. The variable speed drives for the rotary and pull-down allowed an accelerated rate of drilling in feet per day, and at the end of the field tests, there were no indications of wear on any working parts.

What is claimed is:

1. In a drill rig, a power transmission mechanism for driving a drill rotary comprising a rotatable power input shaft, a variable speed assembly including a rotatable input shaft, a rotatable output shaft, and a variable speed torque transmitting means disengageably coupling said input shaft to said output shaft and controlling the rotational speed of said output shaft in a forward direction relative to the rotational speed of said input shaft, a rotatable power output shaft to drive said drill rotary, torque transmitting means coupling said power input shaft to said input shaft of said variable speed assembly, torque transmitting means coupling said output shaft of said variable speed assembly to said power output shaft, and torque transmitting means disengageably coupling said power input shaft to said output shaft of said variable speed assembly to drive said output shaft at a constant speed relative to the speed of said power input shaft and in a reverse direction.

2. In a drill rig, a power transmission mechanism for driving a drill pull down means at a variable speed comprising a rotatable power input shaft, a rotatable drive shaft, an epicyclic gear train including a sun gear, a planetary gear carrier and an output gear, a variable speed assembly including a rotatable input shaft, a rotatable output shaft and a variable speed hydraulic torque transmitting means disengageably coupling said input shaft to said output shaft and controlling the rotational speed of said output shaft in a forward direction relative to the rotational speed of said input shaft, a rotatable power output shaft driving said drill pull down means, torque transmitting means coupling said power input shaft to said input shaft of said variable speed assembly, torque transmitting means coupling the output shaft of said variable speed assembly to said drive shaft, torque transmitting means coupling said drive shaft to said planetary gear carrier of said epicyclic gear train, torque transmitting means coupling said output gear of said epicyclic gear train to said power output shaft, and a first disengageable torque transmitting means, said first disengageable torque transmitting means when engaged coupling said drive shaft to said sun gear of said epicyclic gear train at the proper drive ratio to cause said output gear of said epicyclic gear train to drive said power output shaft in a rotational direction causing said drill pull down means to provide a downward force on a drill.

3. In a drill rig, a power transmission mechanism as defined in claim 2 further comprising reversing means to drive said pull down mechanism at a constant speed in an opposite direction, said reversing means comprising a second disengageable torque transmitting means, said second disengageable torque transmitting means when engaged coupling said power input shaft to said drive shaft and a third disengageable torque transmitting means, said third disengageable torque transmitting means when engaged coupling said power input shaft to said sun gear of said epicyclic gear train at the proper drive ratio to cause said output gear of said epicyclic gear train to drive said power output shaft in a rotational direction opposite to that required for pull down.

4. In a drill rig, a power transmission mechanism as defined in claim 3 comprising in addition braking means, said braking means comprising a fourth disengageable torque transmitting means, said fourth disengageable torque transmitting means when engaged coupling said drive shaft to said sun gear of said epicyclic gear train at the proper ratio to prevent said output gear of said epicyclic gear train from turning.

5. In a drill rig, a power transmission mechanism as defined in claim 4 comprising in addition a control means operative to produce engagement of said first and said second disengageable torque transmitting means alternately thereby preventing simultaneous engagement of said first and said second disengageable torque transmitting means.

6. In a drill rig, a power transmission mechanism as defined in claim 4 comprising in addition a control means operative to produce engagement of said third and said fourth disengageable torque transmitting means alternately thereby preventing simultaneous engagement of said third and said fourth disengageable torque transmitting means.

7. In a drill rig, a power transmission mechanism for delivering power to a line hoist drum comprising a rotatable power input shaft, a rotatable drive shaft, an epicyclic gear train comprising a sun gear, a planetary gear carrier and a power output shaft, a first disengageable torque transmitting means, said first disengageable torque transmitting means when engaged coupling said power input shaft to said drive shaft, torque transmitting means coupling said drive shaft to said planetary gear carrier of said epicyclic gear train, second disengageable torque transmitting means, said second disengageable torque transmitting means when engaged coupling said power input shaft to said sun gear of said epicyclic gear train at the proper drive ratio to cause said power output shaft to rotate, and torque transmitting means coupling said power output shaft to said line hoist drum.

8. In a drill rig, a power transmission mechanism as defined in claim 7 further comprising a braking means, said braking means comprising a third disengageable torque transmitting means, said third disengageable torque transmitting means when engaged coupling said drive shaft to said sun gear at the proper drive ratio to prevent said power output shaft from turning.

9. In a drill rig, a power transmission mechanism as defined in claim 8 further comprising a control means operative to engage said second and said third disengageable torque transmitting means alternately thereby to prevent simultaneous engagement of said second and said third disengageable torque transmitting means.

10. A power transmission mechanism for driving a drill rotary at a variable speed, a drill pull down means at a variable speed and a line hoist drum, the combination comprising a rotatable power input shaft, a rotatable drive shaft, first and second variable speed assemblies each comprising a rotatable input shaft, a rotatable output shaft and a variable speed torque transmitting means disengageably coupling said input shaft to said output shaft and controlling the rotational speed of said output shaft relative to the rotational speed of said input shaft, first and second epicyclic gear trains each comprising a sun gear, a planetary gear carrier and an output gear, a first rotatable power output shaft driving said drill rotary, a second rotatable power output shaft driving said drill pull down means, torque transmitting means coupling said output shaft of said first variable speed assembly to said first power output shaft, torque transmitting means coupling said output gear of said first epicyclic gear train to said second power output shaft, torque transmitting means coupling said output gear of said second epicyclic gear train to said line hoist drum, torque transmitting means coupling said input power shaft to said input shaft of said first variable speed assembly, torque transmitting means coupling said power input shaft to said input shaft of said second variable speed assembly, torque transmitting means coupling said output shaft of said second variable speed assembly to said drive shaft, torque transmitting means coupling said drive shaft to said planetary gear carrier of said first epicyclic gear train and to said planetary gear carrier of said second epicyclic gear train, a first disengageable torque transmitting means, said first disengageable torque transmitting means when engaged coupling said power input shaft to said drive shaft, a second disengageable torque transmitting means, said second disengageable torque transmitting means when engaged coupling said drive shaft to said sun gear of said first epicyclic gear train at the proper ratio to cause said output gear of said first epicyclic gear train to rotate in one direction, a third disengageable torque transmitting means, said third disengageable torque transmitting means when engaged coupling said power input shaft to said sun gear of said first epicyclic gear train at the proper ratio to cause said output gear of said first epicyclic gear train to rotate in a direction opposite to said one direction, fourth disengageable torque transmitting means, said fourth disengageable torque transmitting means when engaged coupling said power input shaft to said sun gear of said second epicyclic gear train at the proper drive ratio to cause said power output gear of said second epicyclic gear train to rotate in one direction.

11. A power transmission mechanism as defined in claim 10 further comprising fifth disengageable torque transmitting means, said fifth disengageable torque transmitting means when engaged coupling said power input shaft to said output shaft of said first variable speed assembly to drive said output shaft in a direction reverse to that provided by said first variable speed assembly.

12. A power transmission mechanism as defined in claim 10 further comprising a control means operative to engage said first and said second disengageable torque transmitting means alternately thereby preventing simultaneous engagement of said first and said second disengageable torque transmitting means.

13. A power transmission mechanism as defined in claim 10 further comprising braking means to said drill pull down means and to said line hoist drum, said braking means to said drill pull down means comprising sixth disengageable torque transmitting means, said sixth disengageable torque transmitting means when engaged coupling said drive shaft disengageably to said sun gear of said first epicyclic gear train at the proper drive ratio to prevent said output shaft of said first epicyclic gear train from turning and said braking means to said line hoist drum comprising a seventh disengageable torque transmitting means, said seventh disengageable torque transmitting means when engaged coupling said drive shaft to said sun gear of said second epicyclic gear train at the proper ratio to prevent said output shaft of said second epicyclic gear train from turning.

14. A power transmission mechanism as defined in claim 13 further comprising a control means operative to engage said third and said sixth disengageable torque transmitting means alternately thereby preventing simultaneous engagement of said third and said sixth disengageable torque transmitting means.

15. A power transmission mechanism as defined in claim 13 further comprising a control means operative to engage said fourth and said seventh disengageable torque transmitting means alternately thereby preventing simultaneous engagement of said fourth and said seventh disengageable torque transmitting means.

16. A power transmission mechanism to provide variable speed drive to a drill rotary, constant speed reverse drive to said drill rotary, variable speed drive to a drill pull down means, constant speed reverse drive to said drill pull down means, braking to said drill pull down means, constant speed drive to a line hoist drum, and braking to said line hoist drum, the combination comprising a rotatable power input shaft, a drive shaft, first and second variable speed assemblies each comprising a rotatable input shaft, a rotatable output shaft and a variable speed torque transmitting means disengageably coupling said input shaft and said output shaft and controlling the rotational speed of said output shaft relative to the rotational speed of said input shaft, first and second epicyclic gear trains each comprising a planetary gear carrier, a sun gear and an output gear, a first rotatable power output shaft driving said drill rotary, a second rotatable power output shaft driving said drill pull down means, torque transmitting means coupling said output shaft of said first variable speed assembly to said first power output shaft, torque transmitting means coupling said output gear of said first epicyclic gear train to said second power output shaft, torque transmitting means coupling said output gear of said second epicyclic gear train to said line hoist drum, torque transmitting means coupling said power input shaft to said input shaft of said first variable speed assembly, a first disengageable torque transmitting means, said first disengageable torque transmitting means when engaged coupling said power input shaft to said output shaft of said first variable speed assembly to rotate said output shaft in a direction reverse to that provided by said first variable speed assembly, torque transmitting means coupling said power input shaft to said input shaft of said second variable speed assembly, torque transmitting means coupling said output shaft of said second variable speed assembly to said drive shaft, torque transmitting means coupling said drive shaft to said planetary gear carriers of said first and said second epicyclic gear trains, second disengageable torque transmitting means, said second disengageable torque transmitting means when engaged coupling said drive shaft to said sun gear of said first epicyclic gear train at the proper drive ratio to rotate said output gear of said first epicyclic gear train in one direction, third disengageable torque transmitting means, said third disengageable torque transmitting means when engaged coupling said power input shaft to said drive shaft, fourth disengageable torque transmitting means, said fourth disengageable torque transmitting means when engaged coupling said power input shaft to said sun gear of said first epicyclic gear train at the proper drive ratio to rotate said output gear of said first epicyclic gear train in a direction reverse to said one direction of said first epicyclic output gear, fifth disengageable torque transmitting means, said fifth disengageable torque transmitting means when engaged coupling said power input shaft to said sun gear of said second epicyclic gear train at the proper drive ratio to rotate said output gear of said second epicyclic gear train, sixth disengageable torque transmitting means, said sixth disengageable torque transmitting means when engaged coupling said drive shaft to said sun gear of said first epicyclic gear train at the proper drive ratio to prevent rotation of said output gear of said first epicyclic gear train, seventh disengageable torque transmitting means, said seventh disengageable torque transmitting means when engaged coupling said drive shaft to said sun gear of said second epicyclic gear train at a proper drive ratio to prevent rotation of said output gear of said second epicyclic gear train.

17. A power transmission mechanism as defined in claim 16 further comprising a control means operative to engage said second and said third disengageable torque transmitting means alternately thereby to prevent simultaneous engagement of said second and said third disengageable torque transmitting means.

18. A power transmission mechanism as defined in claim 16 further comprising a control means operative to engage said fourth and said sixth disengageable torque transmitting means alternately thereby to prevent simultaneous engagement of said fourth and said sixth disengageable torque transmitting means.

19. A power transmission mechanism as defined in claim 16 further comprising a control means operative to engage said fifth and said seventh disengageable torque transmitting means alternately thereby to prevent simultaneous engagement of said fifth and said seventh disengageable torque transmitting means.

20. A power transmission mechanism as defined in claim 16 further comprising a water-tight and dust-tight cover surrounding all of said transmission except a portion of said power input shaft, a portion of said first power output shaft, a portion of said second power output shaft and a portion of said torque transmitting means coupling said output shaft of said second epicyclic gear train to said line hoist drum.

21. A power transmission mechanism as defined in claim 20 further comprising external lever controls connected to said disengageable torque transmitting means and said variable speed couplings and operative to control the engagement and disengagement thereof.

22. A power transmision mechanism as defined in claim 17 wherein said control means is a double clutch.

23. A power transmission mechanism as defined in claim 18 wherein said control means is a double clutch.

24. A power transmisison mechanism as defined in claim 19 wherein said control means is a double clutch.

25. In a drill rig, a power transmision mechanism for driving a drill rotary as defined in claim 1, further comprising a first control means operative to produce engagement of said variable speed coupling for the transmission of torque from said input shaft to said output shaft to drive said output shaft at a speed variable with respect to the speed of said power input shaft, a second control means operative to produce engagement of said torque transmitting means disengageably coupling said power input shaft to said output shaft to drive said output shaft at a speed constant with respect to said power input shaft, and control interlock means preventing simultaneous operation of said first control means and said second control means.

26. In a drill rig, a power transmision mechanism as defined in claim 11 further comprising a first control means operative to produce engagement of said variable speed coupling for the transmission of torque from said input shaft to said output shaft to drive said output shaft at a speed variable with respect to the speed of said power input shaft, a second control means operative to product engagement of said torque transmitting means disengageably coupling said power input shaft to said output shaft to drive said output shaft at a speed constant with respect to said power input shaft, and control interlock means preventing simultaneous operation of said first control means and said second control means.

27. A power transmisison mechanism as defined in claim 16 further comprising a first control means operative to produce engagement of said variable speed coupling for the transmision of torque from said input shaft to said output shaft to drive said output shaft at a variable speed with respect to the speed of said power input shaft, a second control means operative to produce engagement of said torque transmitting means disengageably coupling said power input shaft to said output shaft to drive said output shaft at a speed constant with respect to said power input shaft, and control interlock means preventing simultaneous operation of said first control means and said second control means.

References Cited in the file of this patent

UNITED STATES PATENTS

| | | |
|---|---|---|
| 1,874,264 | Faulkner et al. | Aug. 30, 1932 |
| 2,151,057 | Suth | Mar. 21, 1939 |
| 2,215,928 | Hornbrook | Sept. 24, 1940 |
| 2,564,188 | Burg et al. | Aug. 14, 1951 |
| 2,588,408 | O'Leary | Mar. 11, 1952 |
| 2,589,118 | O'Leary | Mar. 11, 1952 |
| 2,594,666 | Lone | Apr. 29, 1952 |
| 2,618,440 | Scott et al. | Nov. 18, 1952 |
| 2,637,220 | Alspaugh | May 5, 1953 |